US010409448B2

(12) United States Patent
Cristoforo

(10) Patent No.: US 10,409,448 B2
(45) Date of Patent: Sep. 10, 2019

(54) SYSTEM AND METHOD FOR INTERACTIVE VISUAL ANALYTICS OF MULTI-DIMENSIONAL TEMPORAL DATA

(71) Applicant: STATE STREET CORPORATION, Boston, MA (US)

(72) Inventor: Albert J. Cristoforo, Winchester, MA (US)

(73) Assignee: State Street Corporation, Boston, MA (US)

( * ) Notice: Subject to any disclaimer, the term of this patent is extended or adjusted under 35 U.S.C. 154(b) by 0 days.

(21) Appl. No.: 15/895,119

(22) Filed: Feb. 13, 2018

(65) Prior Publication Data

US 2018/0173402 A1    Jun. 21, 2018

Related U.S. Application Data

(63) Continuation of application No. 15/404,796, filed on Jan. 12, 2017, now abandoned, which is a continuation of application No. 14/020,479, filed on Sep. 6, 2013, now abandoned.

(51) Int. Cl.
*G06F 3/0481* (2013.01)
*G06Q 40/04* (2012.01)

(52) U.S. Cl.
CPC ......... *G06F 3/04815* (2013.01); *G06Q 40/04* (2013.01)

(58) Field of Classification Search
CPC .................................................. G06Q 40/04
See application file for complete search history.

(56) References Cited

U.S. PATENT DOCUMENTS

| 8,815,986 B2* | 8/2014 | Ueno ................ C08J 5/24 524/104 |
| 2005/0091596 A1 | 4/2005 | Anthony et al. |
| 2005/0177498 A1 | 8/2005 | Tenorio |
| 2005/0289482 A1 | 12/2005 | Anthony et al. |
| 2008/0256444 A1 | 10/2008 | Min et al. |
| 2012/0324401 A1* | 12/2012 | Morris ............ G06F 3/04815 715/836 |
| 2015/0035833 A1* | 2/2015 | Hao ................ G06T 11/206 345/440 |

FOREIGN PATENT DOCUMENTS

| CN | 102597992 A | 7/2012 |
| JP | 2005-141397 A | 6/2005 |
| JP | 2011-138495 A | 7/2011 |
| TW | 200900974 A | 1/2009 |
| TW | I367448 | 7/2012 |

* cited by examiner

*Primary Examiner* — Lindsay M Maguire

(57) ABSTRACT

Multi-dimensional temporal data can provide insight into patterns, trends and correlations. Traditional 2D-charts are widely used to support domain analysts' work, but are limited to present large-scale complicated data intuitively and do not allow further exploration to gain insight. A visual analytics system and method which supports interactive analysis of multi-dimensional temporal data, incorporating the idea of a novel visualization method is provided. The system extends the ability of mapping techniques by visualizing domain data based on a 3D geometry enhanced by color, motion and sound. It allows a compact universal overview of large-scale data and drilling down for further exploration. By customizable visualization, it can be adapted to different data models and applied to multiple domains. It helps analysts interact directly with large-scale data, gain insight into the data, and make better decisions.

17 Claims, 37 Drawing Sheets

| CLIENT SEGMENT | USE CASE | VISUALIZATION FUNCTIONALITY |
|---|---|---|
| • C-suite execs (CIO, CRO) | • Asset allocation<br>• Performance attribution<br>• Enterprise risk management and regulatory affairs | Assessment of portfolio risk and performance by manager or factor (asset class, geography, sector, style, liquidity) |
| • Portfolio managers | • Asset selection<br>• Performance attribution | Assessment of portfolio performance by security or factor (asset class, geography, sector, style, liquidity) |
| • Retail investment advisors | • Asset selection<br>• Performance attribution | Assessment of portfolio risk and performance by security or factor (asset class, duration of liability, liquidity) |
| • Traders | • Asset selection<br>• Transaction cost analysis | Security selection by factor (style, liquidity) |

Fig. 12A

| CLIENT SEGMENT | USE CASE | VISUALIZATION FUNCTIONALITY |
|---|---|---|
| • C-suite execs (CIO, CRO, CFO) | • Asset allocation<br>• Performance attribution<br>• Risk management<br>• Manager selection | Assessment of portfolio risk and performance by manager or factor (asset class, geography, sector, style, liquidity) |
| • Traders & eExchange businesses | • Asset selection<br>• Transaction cost analysis | Security selection by factor (asset class, geography, sector, style, liquidity) |
| • GM Strategy teams | • Performance attribution<br>• Risk assessment | Investor behavior by factor (asset class, geography, sector, style, liquidity) |
|  |  |  |

Fig. 12B

SYSTEM AND METHOD FOR INTERACTIVE VISUAL ANALYTICS OF MULTI-DIMENSIONAL TEMPORAL DATA

CROSS REFERENCE TO RELATED APPLICATIONS

This application is a continuation of U.S. patent application Ser. No. 15/404,796, filed Jan. 12, 2017 which is a continuation of U.S. patent application Ser. No. 14/020,479, filed Sep. 6, 2013, the disclosure of which is hereby incorporated by reference in its entirety.

FIELD OF THE INVENTION

The present invention relates to computer-based system and method for interactive analysis of multi-dimensional temporal data, and more specifically to computer-based system and method for three-dimensional visualizations of large-scale data.

BACKGROUND OF THE INVENTION

Multi-dimensional and temporal data are very common in many business and scientific domains. Nowadays, large-scale data is growing at explosive speed everywhere. While the capacity to collect and store new data grows rapidly, the ability to analyze these data volumes has been increasing at much lower rates. Although it is not easy to analyze large-scale complex data, it is useful to gain insight into patterns, trends and correlations. This means there is greater potential value in large-scale complex data.

In the past, researchers have proposed many automatic analysis methods to process and simplify these data, such as Principle Component Analysis, Self-Organizing Map and clustering algorithms. Another typical way to handle large-scale data is on-line analytical processing (OLAP) that partially pre-aggregates data into "cubes" and stores the data in a "data warehouse." However, traditional analysis systems do not offer an effective and flexible way to present the data or provide intuitive analysis results.

Traditional visualization methods, such as two-dimensional (2D)-lines, bars and tables, are simple and intuitive, thus being widely used in our daily life. However, they have limitations when presenting large-scale complicated data. For example, FIG. 1 at 100 and 101 show visualization of ten years of data for China's mutual fund market. It is difficult for analysts to identify patterns and trends in the 2D table at 100, which only contains numbers in each cell. The 2D bars at 101 are more suitable to show past and future trends. However, the 2D bars at 101 are not suitable to display additional detailed information, for example, additional information on certain types of mutual fund.

In the last few decades, other visualization methods have been proposed, such as scatter plots, heat maps, parallel coordinates, tree-maps, Internet map, spiral graphs, density-based distribution maps, sphere-based maps, Theme-River, and TimeWheel. These methods are useful when visualizing certain types of data. For example, a heat map can be applied to depict financial information. A spiral graph is a visualization method to discover the periodic pattern of influenza cases. Parallel coordinates are a common way of visualizing high-dimensional geometry and analyzing multivariate data. The "Cross-Filtered Views" method can visualize and analyze multi-dimensional data. This method interactively expresses sequences of multidimensional set queries by cross-filtering data values across pairs of views. Other proposed methods for visually analyzing temporal data are based on three main criteria: time, data, and representation.

In recent years, Visual Analytics (VA) has been introduced to represent massive, multi-dimensional and temporal data with various visual encodings. Visual Analytics can illustrate patterns, trends and correlations of data in the shortest amount of time in the smallest amount of space. Advantages of visual analytics include the simplicity of design and the ability to analyze data of high complexity. Visual analytics combines automated analysis techniques with interactive visualizations for an effective understanding, reasoning and decision making on the basis of very large and complex datasets. Visual analytics can be applied to many domains, such as finance, health, geography, physics, security, etc.

Visual analytics systems and tools can support domain analysts' decision-making and discoveries of insights through advanced visualization methods and system user-centric interactive operations. One popular commercial tool for visualizing business data is Microsoft Excel, which provides the standard visualization methods for spreadsheet data (bar, column, line, pie, etc.). However, these visualization methods become restrained when the underlying data model consists of complex ideas that need to be communicated with clarity, precision, and efficiency.

A large variety of companies, ranging from specialized data discovery vendors such as Tableau, QlikTech, and Spotfire, to multinational corporations such as IBM, Microsoft, Oracle and SAP, have engaged in efforts to develop their own commercial visual analytics systems for analyzing voluminous data of increasing variety. Large software vendors tend to focus on only a small number of "standard" visualization techniques, such as line charts and tables, which have limited capability in handling large complex data. Existing toolkits for analyzing data include for example, InfoVis Toolkit by SenchaLabs, Redwood City, Calif., Prefuse by An Open Source Foundation, SourForge.net, under BSD license, and Protovis by Stanford Visualization Group, under BSD License.

On the academic side, a number of VA systems have been developed to support domain analysts' work. MobiVis by Visualization & Interface Design Innovation (VIDi) University of California, Davis is a system to visually analyze mobile data by presenting social and spatial information in one heterogeneous network. VIS-STAMP by (Spatial Data Mining and Visual Analytics Lab,) Department of Geography, University of South Carolina is a visual inquiry system for space-time and multivariate patterns. VIS-STAMP supports different complex patterns and, through a variety of interactions, enables system users to focus on specific patterns and examine detailed views of data. WireVis by Bank of America and UNC Charlotte is a system that combines multiple visualization methods to analyze categorical, time-varying data from financial transactions. Weijia Xu et al. designed a system based on a tree-map to analyze large digital collections with interactive visualization. Hotmap is based on a heat map to visualize geography data, using the structure of the underlying data set to visualize it in its own space.

Many researchers have been involved in efforts in developing high-level models of VA system design. More specifically, Tamara Munzner proposed a nested model for the visualization design and validation with four layers: characterize the task and data in the vocabulary of the problem domain, abstract into operations and data types, design visual encoding and interaction techniques, and create algorithms to execute techniques efficiently. Based on that model, Xiaoyu Wang et al. proposed a two-stage framework for designing visual analytics system in organizational environments.

However, the above-described visual analytics tools provide a flat representation of voluminous data and cannot properly address multi-dimensional data. The existing tools have difficulties depicting temporal information of data. These conventional approaches for temporal representation include, for example, heat maps or geometries of rectangles; however, these visualizations are not intuitive and do not convey properly the temporal element of data for the system user to gain insight and trends in large complex data sets.

SUMMARY OF THE INVENTION

The computer-implemented visual analytics system and method of the present invention provide system users with the ability to determine the evolution of a data set with respect to a baseline standard presented as a global sphere. This global sphere may be segmented according to predetermined rules for separating the data set for disposition in segmented portions of the global sphere. The present invention may also include steps of receiving inputs from one or more data feeds, including data feeds from one or more databases, and creating and displaying on a display electronically connected to a computer a three-dimensional global sphere according to first predetermined rules for determining a radius of the global sphere. The global sphere serves as a baseline standard index by which the evolution of the data set will be measured. The present invention also may include the steps of segmenting the global sphere according to longitudinal sections to define a first criterion for locating each data point in one of the longitudinal segments and segmenting the global sphere according to latitudinal segments to define a second criterion for locating each data point in one of the latitudinal segments. As such, using the two criteria, a location for each data point with respect to the global sphere is determined. According to the present invention, time $T_0$ may represent a time when each data point is located at a surface location on the three-dimensional global sphere that has a radius determined by first predetermined rules. Each data point is represented by a three-dimensional sphere having a radius determined by second predetermined rules and the radius of each data point will be influenced over time by at least a first performance criterion.

The system and method of the present invention can track an evolution of each data point from time $T_0$ to time $T_N$ according to information about each data point received from the one or more data feeds or one or more databases, and display on the display with respect to each data point one of the following: (1) changing a length of the radius of the three-dimensional sphere associated with the data point in accordance with the second predetermined rules for determining the radius for the data point and changing the first performance criterion in a first predetermined way if the performance of the data point exceeds the global sphere baseline standard index, (2) changing the length of the radius of the three-dimensional sphere associated with the data point in accordance with the second predetermined rules for determining the radius for the data point and changing the first performance criterion in a second predetermined way if the performance of the data point is less than the global sphere baseline standard index, and (3) maintaining the length of the radius of the three dimensional sphere associated with the data point in accordance with the second predetermined rules for determining the radius for the data point and maintaining a current state of the first performance criterion if the performance of the data point is unchanged. The system and method of the present invention can further include the step of selecting a data point according to the evolution of the data point from $T_0$ to $T_N$.

According to alternative embodiments of the present invention, a visual analytics method is provided for determining the evolution of a data set. This method can include the steps of receiving inputs from one or more data feeds or databases, and creating a virtual three-dimensional global sphere, segmenting the virtual three-dimensional global sphere according to longitudinal sections to define a first criterion for locating a data point in one of the longitudinal segments, segmenting the virtual three-dimensional global sphere according to latitudinal segments to define a second criterion for locating the data point in one of the latitudinal segments.

This alternative embodiment can further include the steps of determining a location of each data point with respect to the virtual three-dimensional global sphere from information about each data point received by the computer from the one or more data feeds or databases, representing at time $T_0$, each data point at a surface location on the virtual three-dimensional global sphere as a three-dimensional sphere having a radius determined by predetermined rules and by at least a first performance criterion, and tracking an evolution of each data point from time $T_0$ to time $T_N$ according to information about each data point received from the one or more data feeds or databases, and displaying on the display with respect to each data point one of the following: (1) changing a length of the radius of the three-dimensional sphere associated with the data point in accordance with the predetermined rules for determining the radius for the data point and changing the first performance criterion in a first predetermined way if the performance of the data point exceeds the global sphere baseline standard index, (2) changing the length of the radius of the three-dimensional sphere associated with the data point in accordance with the predetermined rules for determining the radius for the data point and changing the first performance criterion in a second predetermined way if the performance of the data point is less than the global sphere baseline standard index, and (3) maintaining the length of the radius of the three dimensional sphere associated with the data point in accordance with the predetermined rules for determining the radius for the data point and maintaining a current state of the first performance criterion if the performance of the data point is unchanged. The alternative embodiment can further include the step of selecting a data point according to the evolution of the data point from $T_0$ to $T_N$.

According to alternative embodiments of the present invention, a visual analytics method is provided for determining the evolution of a data set with respect to a baseline standard presented as a global sphere that is segmented according to predetermined rules for separating the data set for disposition in segmented portions of the global sphere. This alternative embodiment can include the steps of receiving inputs from one or more data feeds or databases, and creating and displaying on a display electronically connected to a computer, a three-dimensional global sphere having a global sphere center according to first predetermined rules for determining a radius of the global sphere, with the global sphere serving as a baseline standard index by which the evolution of the data set will be measured. Further according to this alternative embodiment, the global sphere is segmented according to longitudinal sections to define a first criterion for locating a data point in one of the longitudinal segments, segmented according to latitudinal segments to define a second criterion for locating the data point in one of the latitudinal segments, and a location of each data point is determined with respect to the global sphere from information about each data point received by the computer from the one or more data feeds or databases.

The system and method of the present invention can further include the steps of representing at time $T_0$ each data point at a surface location on the global sphere as a three-dimensional sphere having a distance from the global sphere center determined by second predetermined rules and by at least a first performance criterion, and tracking an evolution of each data point from time $T_0$ to time $T_N$ according to information about each data point received from the one or more data feeds and displaying on the display with respect to each data point one of the following: (1) the computer changing the distance from the global sphere center of the three-dimensional sphere associated with the data point in accordance with the second predetermined rules for determining the distance from the global sphere center for the data point and changing the first performance criterion in a first predetermined way if the performance of the data point exceeds the global sphere baseline standard index, (2) computer changing the distance from the global sphere center of the three-dimensional sphere associated with the data point in accordance with the second predetermined rules for determining the distance from the global sphere center for the data point and changing the first performance criterion in a second predetermined way if the performance of the data point is less than the global sphere baseline standard index, (3) maintaining the distance from the global sphere center of the three dimensional sphere associated with the data point in accordance with the second predetermined rules for determining the radius for the data point and maintaining a current state of the first performance criterion if the performance of the data point is unchanged. This alternative embodiment may include the step of selecting a data point according to the evolution of the data point from $T_0$ to $T_N$.

The system and method of the present invention provide a visual analytics embodiment for interactive analysis of multi-dimensional data stored in a database. This embodiment may include steps for receiving the multi-dimensional data from the database, the multi-dimensional data being characterized by at least a name, a type, and a data value associated with at least a point in time, with the multi-dimensional data having the same name being associated with a same entity and the multi-dimensional data having the same type being associated with a same category.

This embodiment can further include the steps of providing on a display a system user-interface for the display of the interactive analysis of the multi-dimensional data, the system user-interface displaying a virtual three-dimensional space and displaying on the display a baseline sphere in the virtual three-dimensional space that has been generated by a computer based on multidimensional data received from the database, with a radius of the baseline sphere from a virtual baseline sphere center corresponds to a first index, the baseline sphere being capable of being segmented by longitudinal and latitudinal sectors. According to this embodiment, it can further include the steps of calculating for each multi-dimensional data a corresponding longitudinal and latitudinal coordinate value, with the longitudinal and latitudinal coordinate value of each multi-dimensional data being calculated based on the multi-dimensional data name defining the longitudinal coordinate and the associated multi-dimensional data type defining the latitudinal coordinate and for each multi-dimensional data, displaying a sphere corresponding to each multi-dimensional data, with each sphere being placed in the virtual three-dimensional space according to the longitudinal and latitudinal coordinate values, and the radius of the sphere associated with each multidimensional data being calculated based on a data value for the multidimensional data, and a distance from a center of each multidimensional data sphere to a center of the baseline sphere being calculated based on a data value for the multidimensional data, and selecting with the computer-based device multidimensional data according to its position relative to the baseline sphere.

The system and method of the present invention includes embodiment of the system for determining the evolution of a data set with respect to a baseline standard presented as a global sphere that is segmented according to predetermined rules for separating the data set for disposition in segmented portions of the global sphere. The system can receive inputs from one or more data feeds or databases, and creating and displaying on the display a three-dimensional global sphere according to first predetermined rules for determining a radius of the global sphere, with the global sphere serving as a baseline standard index by which the evolution of the data set will be measured, segment the global sphere according to longitudinal sections to define a first criterion for locating a data point in one of the longitudinal segments, and segment the global sphere according to latitudinal segments to define a second criterion for locating the data point in one of the latitudinal segments.

This embodiment of the system can further determine a location of each data point with respect to the global sphere from information about each data point received by the computer from the one or more data feeds, and represent at time $T_0$ each data point at a surface location on the global sphere as a three-dimensional sphere having a radius determined by second predetermined rules for determining the radius for the global sphere and by at least a first performance criterion.

Further, this embodiment of the system can track an evolution of each data point from time $T_0$ to time $T_N$ according to information about each data point received from the one or more data feeds and display on the display with respect to each data point one of the following: (1) changing a length of the radius of the three-dimensional sphere associated with the data point in accordance with the second predetermined rules for determining the radius for the data point and changing the first performance criterion in a first predetermined way if the performance of the data point exceeds the global sphere baseline standard index, (2) changing the length of the radius of the three-dimensional sphere associated with the data point in accordance with the second predetermined rules for determining the radius for the data point and changing the first performance criterion in a second predetermined way if the performance of the data point is less than the global sphere baseline standard index, (3) maintaining the length of the radius of the three dimensional sphere associated with the data point in accordance with the second predetermined rules for determining the radius for the data point and maintaining a current state of the first performance criterion if the performance of the data point is unchanged, and select a data point according to the evolution of the data point from $T_0$ to $T_N$.

According to alternative embodiments, a visual analytics system is provided for determining the evolution of a data. The system can receive inputs from one or more data feeds and creating a virtual three-dimensional global sphere, segment the virtual three-dimensional global sphere according to longitudinal sections to define a first criterion for locating a data point in one of the longitudinal segments, and segment the virtual three-dimensional global sphere according to latitudinal segments to define a second criterion for locating the data point in one of the latitudinal segments.

This alternative embodiment of the system can further determine a location of each data point with respect to the virtual three-dimensional global sphere from information about each data point received by the computer from the one or more data feeds, represent on the display at time $T_0$ each data point at a surface location on the virtual three-dimensional global sphere as a three-dimensional sphere having a radius determined by predetermined rules and by at least a first performance criterion, and track an evolution of each data point from time $T_0$ to time $T_N$ according to information about each data point received from the one or more data feeds and display on the display with respect to each data point one of the following: (1) changing a length of the radius of the three-dimensional sphere associated with the data point in accordance with the predetermined rules for determining the radius for the data point and changing the first performance criterion in a first predetermined way if the performance of the data point exceeds the global sphere baseline standard index, (2) changing the length of the radius of the three-dimensional sphere associated with the data point in accordance with the predetermined rules for determining the radius for the data point and changing the first performance criterion in a second predetermined way if the performance of the data point is less than the global sphere baseline standard index, and (3) maintaining the length of the radius of the three dimensional sphere associated with the data point in accordance with the predetermined rules for determining the radius for the data point and maintaining a current state of the first performance criterion if the performance of the data point is unchanged, and select a data point according to the evolution of the data point from $T_0$ to $T_N$.

According to further alternative embodiments, a visual analytics system is provided for determining the evolution of a data set with respect to a baseline standard presented as a global sphere that is segmented according to predetermined rules for separating the data set for disposition in segmented portions of the global sphere. This alternative embodiment of system can receive inputs from one or more data feeds or databases, and create and display on the display electronically connected to the computer a three-dimensional global sphere having a global sphere center according to first predetermined rules for determining a radius of the global sphere, with the global sphere serving as a baseline standard index by which the evolution of the data set will be measured, segment the global sphere according to longitudinal sections to define a first criterion for locating a data point in one of the longitudinal segments, and segment the global sphere according to latitudinal segments to define a second criterion for locating the data point in one of the latitudinal segments.

This alternative embodiment of the system can further determine a location of each data point with respect to the global sphere from information about each data point received by the computer from the one or more data feeds, and represent at time $T_0$ each data point at a surface location on the global sphere as a three-dimensional sphere having a distance from the global sphere center determined by second predetermined rules and by at least a first performance criterion.

Further, this alternative embodiment can track an evolution of each data point from time $T_0$ to time $T_N$ according to information about each data point received from the one or more data feeds and display on the display with respect to each data point one of the following: (1) changing the distance from the global sphere center of the three-dimensional sphere associated with the data point in accordance with the second predetermined rules for determining the distance from the global sphere center for the data point and changing the first performance criterion in a first predetermined way if the performance of the data point exceeds the global sphere baseline standard index, (2) changing the distance from the global sphere center of the three-dimensional sphere associated with the data point in accordance with the second predetermined rules for determining the distance from the global sphere center for the data point and changing the first performance criterion in a second predetermined way if the performance of the data point is less than the global sphere baseline standard index, (3) maintaining the distance from the global sphere center of the three dimensional sphere associated with the data point in accordance with the second predetermined rules for determining the radius for the data point and maintaining a current state of the first performance criterion if the performance of the data point is unchanged, and select a data point according to the evolution of the data point from $T_0$ to $T_N$.

According to alternative embodiments of the system and method of present invention, a visual analytics system is provided for interactive analysis of multi-dimensional data stored in a database. The system can receive the multi-dimensional data from the database, the multi-dimensional data being characterized by at least a name, a type, and a data value associated with at least a point in time, with the multi-dimensional data having the same name being associated with a same entity and the multi-dimensional data having the same type being associated with a same category, provide a user-interface for the display of the interactive analysis of the multi-dimensional data, the user-interface displaying a virtual three-dimensional space, display a baseline sphere in the virtual three-dimensional space that has been generated by the computer based on multidimensional data received from the database, with a radius of the baseline sphere from a virtual baseline sphere center corresponds to a first index the baseline sphere being capable of being segmented by longitudinal and latitudinal sectors.

According to this alternative embodiment, the visual analytics system may calculate for each multi-dimensional data a corresponding longitudinal and latitudinal coordinate value, with the longitudinal and latitudinal coordinate value of each multi-dimensional data being calculated based on the multi-dimensional data name defining the longitudinal coordinate and the associated the multi-dimensional data type defining the latitudinal coordinate and for each multi-dimensional data, display a sphere corresponding to each multi-dimensional data, with each sphere being placed in the virtual three-dimensional space according to the longitudinal and latitudinal coordinate values, and the radius of the sphere associated with each multidimensional data being calculated based on a data value for the multidimensional data, and a distance from a center of each multidimensional data sphere to a center of the baseline sphere being calculated based on a data value for the multidimensional data, and select with the computer-based device multidimensional data according to its position relative to the baseline sphere.

These and other embodiments the present invention will be described in greater detail in a remainder the specification referring to the drawings.

BRIEF DESCRIPTION OF THE DRAWINGS

FIGS. 12A and B show exemplary external and internal use cases, respectively, of the system and methods of the present invention.

DETAILED DESCRIPTION OF THE PRESENT INVENTION

Figure 1:
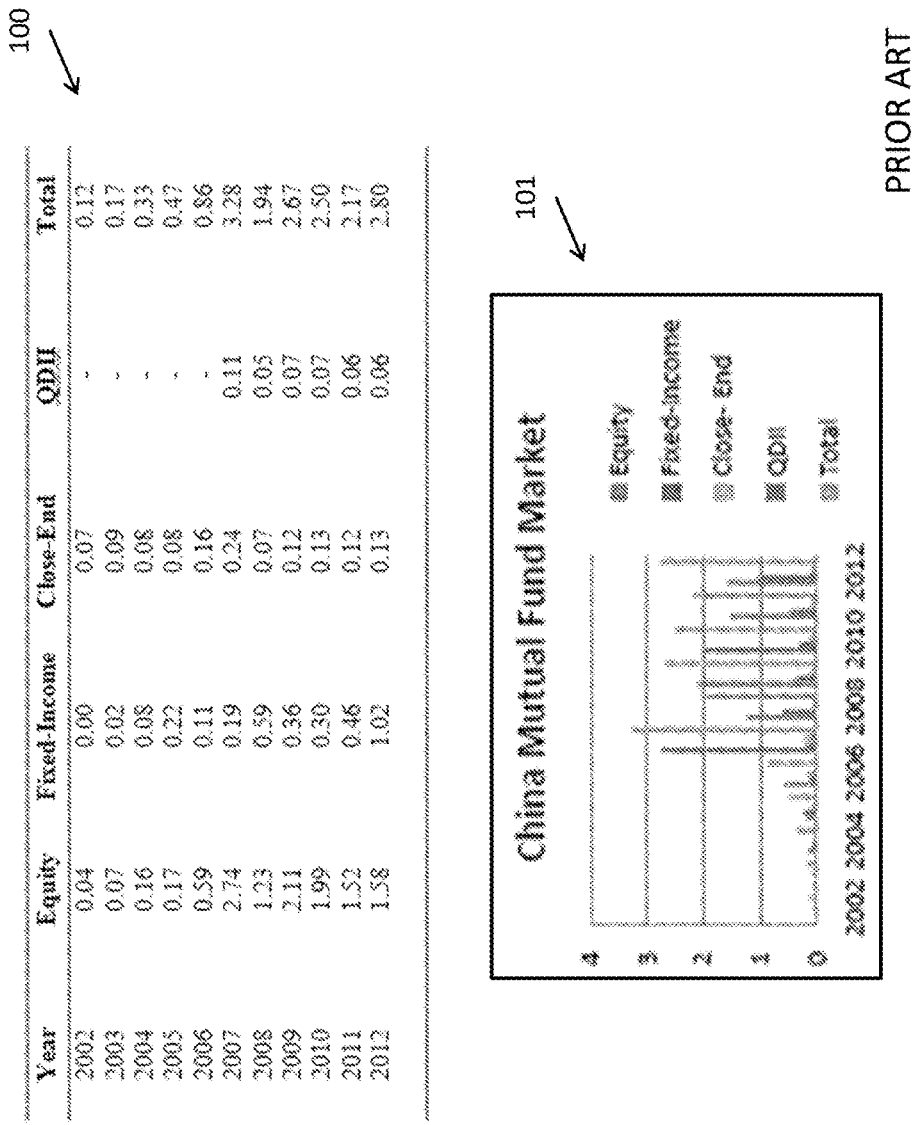
FIG. 1 shows a representative visualization of large-scale data according to prior art methods.

The present invention is directed to visual analytics system and method for providing interactive analysis of multi-dimensional temporal data. The disclosed system and method utilize novel 3D visualizations that allow a compact universal overview of large-scale data, with the ability to drill down for further detail information. The system can extend the ability of existing mapping techniques by visualizing domain data based on a 3D geometry enhanced by size, color, motion and sound. The system is designed with customizable visualization that can be adapted to different data models and applied to multiple domains. The system adapts to the different data models by using a virtual universe and a set of spheres to visualize the data, leveraging the longitude, latitude and distance from the center of sphere to define a data model. Difference perspective views and provided filters can be adapted to provide visualization of the different data models.

The visualization system and method when used for the financial industry can provide an assessment of portfolio risk and performance by investment manager, industry sector, asset class, geography, or other factors in the context of time and spatial relationships to a benchmark, such as, for example, the S&P 500. The system and method of the present invention may also be used for visualization operational risk in a corporate operating environment.

When the system and method of the present invention is used for visualization of a segment of the financial industry, such as the US mutual fund initially, it has the capacity for visualization of the entire US mutual fund industry in a single geometry based on a universe of spheres. Each sphere represents a fund data point and is enhanced by size, color, motion and sound. The system uses a time axis to visualize a static universe in a fixed time frame and at the same time can show the dynamic evolution of the universe over any time period.

As an example, on Dec. 31, 2011, the US Mutual Fund Industry had a combined total of 765 Fund Management Companies, and about 21,000 Fund share classes with total assets of 9.8 trillion. On Jun. 30, 2013 the US Mutual Fund Industry had 23,000 fund share classes and 11 trillion in assets. The system and method of the present invention can present the evolution of the mutual fund market with dynamic 3D visualization, as will be shown.

Compared to prior art systems, the disclosed system is more flexible and can be applied to different domains where multi-dimensional and temporal data exists. The system and method of the present invention provides novel 3D visualizations of large-scale data in a universal overview, large-scale data management, temporal data visualization, and interactive analysis of data.

The visual analytic system and method of the present invention can access the Graphics Processing Unit (GPU) of a computer. For example, the system and method can access libraries of routines and functions of the GPU to efficiently handle the visualization of large data sets. The GPU enables a computer to render complex 3D computer animations.

Visualization Techniques

Visual Encodings

The system and method of the present invention visualize large scale data in a vast universe. The components of this universe include a global benchmark and data points that are segmented and distributed about the global benchmark according to predetermined rules as will be described.

Figure 2:
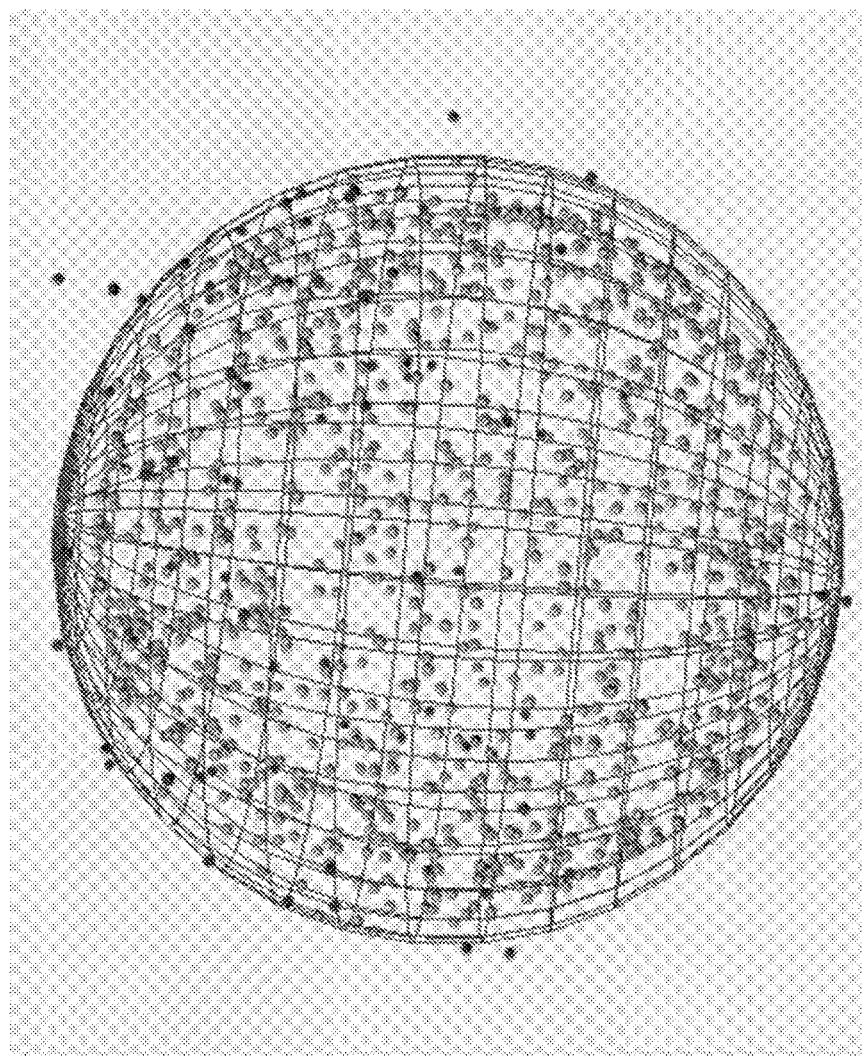
FIG. 2 shows a representative visualization of a whole data set presented in a single universe where each data point is represented by a sphere according to embodiments of the present invention.

Referring to FIG. 2, generally at 200, an overview of an entire data set is presented in a single universe. Each data point is represented by a sphere. Each sphere will have a different size in the 3D universe based on predetermined rules, such as the net asset value (NAV) of a mutual fund data point, and each may be enhanced by color, motion and sound. For example, in FIG. 2, the data points spheres having a first color that are outside the large global sphere may indicate that such data points have outperformed with respect to the large global sphere acting as a standard index and the data point spheres having a second color that are inside the large global sphere may indicate that these data points have underperformed with respect to the large global sphere acting as a standard index. Attributes of multi-dimensional data can be mapped to these visual encodings with optional data models, thus allowing a compact overview of the whole data set.

The system and method of the present invention can use a time axis to visualize temporal data. In addition to displaying a static universe in a fixed time frame, the system can display the dynamical evolution of the universe over any time period.

Customizable Visualization

The system and method of the present invention provide and ability to customize visualization of data. Re-parameterized settings may lead to completely different data model and visual representations, even with the same data and visualization techniques. By changing visual parameter settings, users can gain different visual impressions and can have more opportunities to get insight into patterns, trends and correlations of the data. Customizable visualization is achieved by designing different data models for different user demands and use cases. The system and method of the present invention allow system users to set their own workspace with selected data set and build data models with customizable parameters.

Interaction Design

The system and method of the present invention allow system users to have multiple interactions with the visualization of data. These interactions can offer valuable information and aid the analysis of large data sets. Through interactive manipulation of a visual interface, better understanding of the data set is constructed, tested, refined, and shared. A considerable amount of information regarding a system user's analysis process with a visualization tool is captured by such interactions. The system and method of the present invention implement several interactive features in the following ways:

Data Filter: By default, the universe presents an overview of the entire data set. System users may select certain types of data they interested in, and the other data will be filtered from the universe.

Navigation: Since the spheres are distributed in a 3D universe and there is an earth frame, spheres on the back side or inside the earth frame may be occluded by those on the front side or outside the earth. The system and method of the present invention allow system users to rotate the earth to explore it from different angles. System users can also zoom in to have a more detailed view of some special groups of spheres or spheres inside the earth.

Detail on Demand: When a sphere is far away from the universe center, it may have special attribute values that are greatly different from others. These "outliers" may have great potential benefit to further investigate. System users can click the sphere and drill down for detailed information which will be presented in a small window. Furthermore, an HTTP link associated with the sphere can guide a user to a website which offers information and other external resources for the sphere.

Auto-Play: There is a time axis at the bottom of the universe. When dragging the time axis, the universe will change accordingly to present the state of the data set that corresponds to a particular time selected using the time axis. However, it can be difficult to present the continuous change over a long period of time by manual operation. Therefore, the system and method of the present invention provide auto-play functionality to move along the time axis automatically with optional speed up, thus allowing system users to focus on analysis of patterns, trends and correlations.

Figure 3:
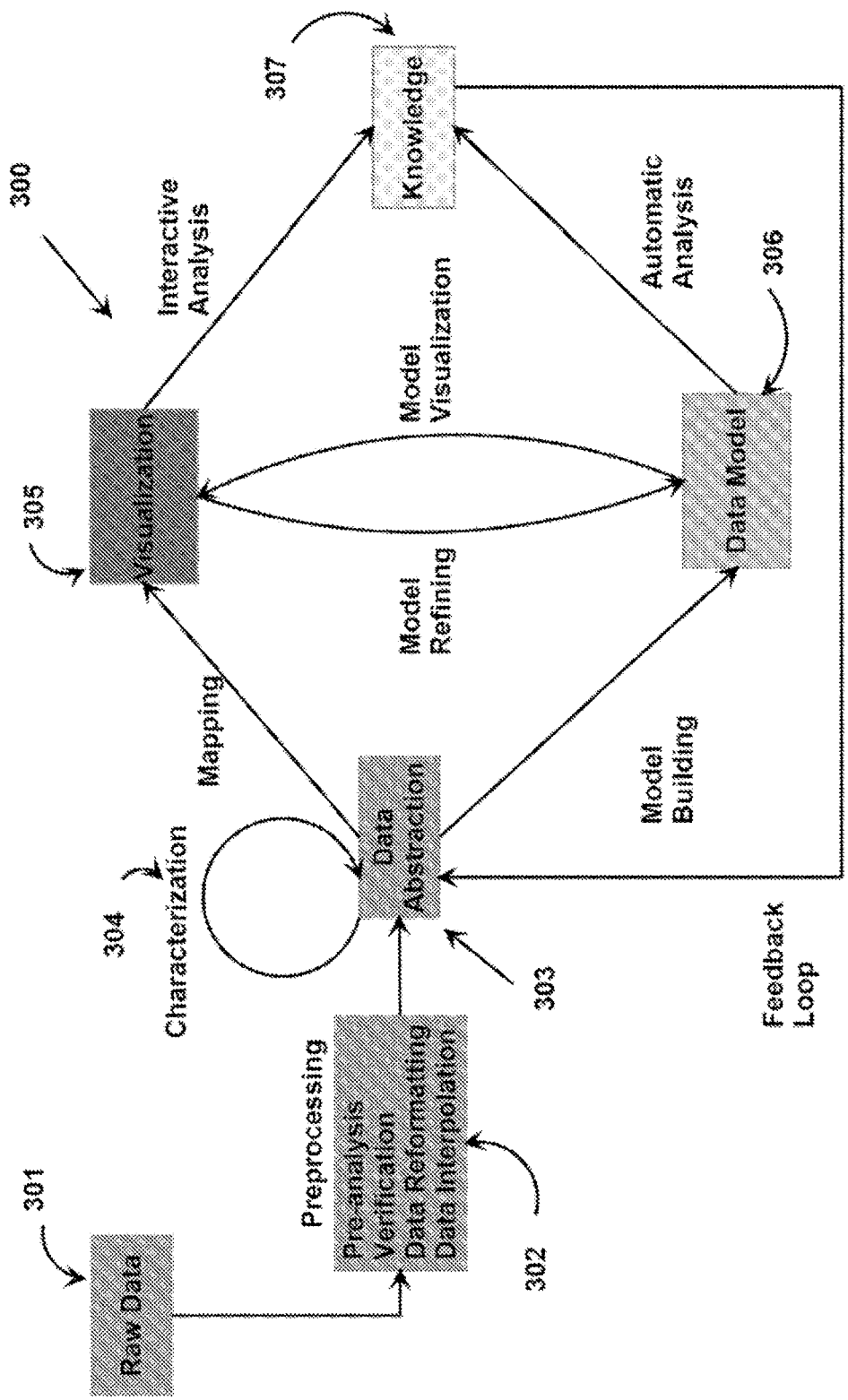
FIG. 3 shows a representative visual analytics process according to embodiments of the present invention.

Referring to FIG. 3, generally at 300, the visual analytics process of the present invention is shown. The visual analytics process combines automatic analysis and visualization methods with a tight coupling through system user interaction in order to gain knowledge and information from data. FIG. 3 shows an abstract overview of the stages and the transitions in the visual analytics process.

In many application scenarios, raw data 301 from heterogeneous data sources needs to be integrated before visual or automatic analysis methods can be applied. The raw data often contains different types of errors, and some of the data is incomplete. Therefore, the first step at 302 is to pre-process and transform the raw data to derive different representations for further exploration. During the process, pre-analysis and verification are used to guarantee the quality of data. Other typical pre-processing tasks include data reformatting, data interpolation, data cleaning, normalization, grouping, and integration.

At step 303, data abstraction may be used to generate abstract data sets independent from their corresponding sources. After the transformation, the characterization of data (step 304) needs to be defined clearly so that the important attributes can be extracted for visualization and analysis. After characterization at 304, a data analyst can choose between applying visual or automatic analysis methods, or both. If an automated analysis is used first, data mining methods are applied to build models of the data. Once a preliminary model is created, the data analyst can evaluate and refine the model, which can be done by interacting with the data. Visualizations allow the data analyst to interact with the automatic methods by modifying parameters or selecting other analysis algorithms.

Model visualization 305 can be used to evaluate the findings of the generated models 306. This process leads to a continuous refinement and verification of the preliminary model.

Using the present invention, misleading results in an intermediate step can be discovered at an early stage, leading to more suitable data models and higher confidence. If visual data exploration is performed first, the system user has to confirm the generated hypotheses by interactive analysis. System user interactions with the visualization can reveal insightful information, for instance by zooming in on different data areas or by considering different visual views on the data. Findings in the visualizations can be used to steer model building when automatic analysis is performed. Therefore, in the visual analytics process, knowledge 307 can be gained from visualization, automatic analysis, as well as the preceding interactions between visualizations, models, and the data analysts.

Representative Study

A representative study using the system and method of the present invention has been conducted using real world data in the China Mutual Fund Industry financial domain from an analysis conducted by an analysis group.

The analysis group projected that by late 2015, China's financial services industry total assets under management ("AUM") (including public and non-public funds) will have approached 1 trillion USD. While such a high asset volume may not be permanently sustained, it will provide a basis for additional investment into the industry on the part of managers. This will be buoyed by growth in non-public segments, itself driven by increases in demand from high-net worth and institutional investors. Highly unbalanced portfolios, both geographically and within asset classes will motivate this shift. QDII—the program through which domestic investors buy into global securities—also has considerable room for growth given its small current size. Global investors are also severely underweighted to China, and rebalancing of portfolios, as well as the emergence of the Greater China asset class (separate from BRICS (Brazil, Russia, India, China, and South Africa)) will provide significant impetus for such a transition.

There are currently several significant and large pools of assets in Mainland China that have not yet been put to work. These range from insurer's own capital, to pension and other centralized funds that are currently highly concentrated into cash and fixed income. These imbalances alone do not mean that investments will be reallocated. Rather, the gap serves as the basis for assumptions on how asset flows will be redirected over the coming years, in order to seize potential opportunities for entrants or participants in China's financial services industry. In addition to being directly involved in the financial services industry, growth will also provide support for ancillary and tertiary services, which are at present, significantly underdeveloped within the domestic fund industry and becoming more important as firms face rising costs.

However, there still lacks a powerful way to explore and demonstrate this entire process and help decision-making as well as policy-making. Traditional analysis with "basic" visualization methods cannot offer a compact overview of the whole mutual fund market, and other analysis tools powered by "slightly advanced" visualization methods lack of detailed information about single or certain group of mutual fund. Visual Analytics, which combines both automatic, intelligent data analysis methods with highly effective visualization and interaction facilities, can transform large-scale complex data into reliable and comprehensible knowledge.

The system and method of the present invention can visualize the entire mutual fund market while retaining the information of a single mutual fund as specific as possible. Moreover, the disclosed system and method can visualize the market dynamic change over periods of time. The disclosed system and method can also support the domain analysts' work.

Data Characterization

The first step of designing a visual analytics system according to the present invention is to define the goal and characterization of the data, which will determine the choice of visual encodings and the data model. Using mutual funds as an example, a mutual fund is a type of professionally managed collective investment vehicle that pools money from many investors to purchase securities. There is a wide variation in mutual fund data, which is always highly-dimensional and changes dynamically. The characteristics of a mutual fund for purposes of the system and method of the present invention are listed below:

Net asset value (NAV): It is the value of mutual fund's assets less the value of its liabilities, often in relation to open-end or mutual funds, since shares of such funds registered with the U.S. Securities and Exchange Commission are redeemed at their net asset value.

Growth Rate and Volatility: These measure the performance of a mutual fund. Negative growth rate is usually considered "bad". Mutual fund with high volatility often means high return with high risk, which makes it difficult to judge.

Fund Type: Since mutual fund is a broad concept, all mutual funds data are classified into seven types by their principal investments. They are: Equity Fund, Blend Fund, Qualified Domestic Institutional Investor (QDII), Fixed-Income Fund, Short-Term Debt Fund, Money-Market Fund, and Closed-End Fund. QDII is a scheme relating to the capital market set up to allow financial institutions to invest in offshore markets such as securities and bonds. For illustration purposes QDII herein mainly refers to China QDII.

Client: It is the financial company who runs a certain mutual fund.

A preliminary analysis of real data can be conducted before visualization. With the analysis of all China mutual funds' NAV, a very large gap is discovered between different mutual funds. The NAV ratio can be nearly 1000:1 when comparing the largest and smallest mutual fund. This is a very important characteristic of China mutual fund market that should be taken into consideration when building data model.

Data Management

Data Management is important for VA tools, which aims to ensure data consistency, avoiding duplication and handling data transactions. Most of the data in the disclosed system is fetched from different web sites where the format and content of data can vary a lot. Before applying visualization techniques to build data models, these heterogeneous data must be pre-processed, integrated and verified.

For purposes of example only, data was retrieved from two data sources (i) CSRC, for China fund data and (ii) Morningstar, for USA fund data. An Apache HttpClient, which is an open source crawling tool, was used to retrieve the data. The data can contain, for example, the fund name, the fund type, the fund code, the establishing date, and the fund value for an entire year, e.g., 2012. The use of CSRC and Morningstar is for a particular use of the visualization system and method in connection with the fund industry. It can be understood that any other database can be used as a data source. For example, the use of the disclosed system and method is not limited in the financial industry. Other industries can utilize the disclosed embodiments. For example, the disclosed system and method can provide valuable data analysis in commerce, transportation, or any other situation for providing visualization of large data sets.

Preferably, the data quality problem is handled after collecting the data, as the data could be incomplete, inconsistent or contain measurement errors. The "weighted voting" strategy is adopted to address the quality problem. Weighted voting represents a generalization of a basic quorum-based scheme. For example, there are four major publicly available data sources in the China mutual fund market, named CSRC, JRJ, HeXun and Yinghe. Each data source is assigned with a weight according to its confidence level. The official data source, CSRC, should have higher weight since it is more reliable, while the other three sources have lower and similar weights. If there are different data values among these data sources, each source will "vote" for their own version. Score of a data version is the summary of the weighted voting, and the version with the highest score will be chosen. In most cases, the data from CSRC is reliable and a rule is defined to identify potential issue. When CSRC's version is not chosen and the difference between CSRC and the voted one is significant, an alert will be fired to the observer.

Basic Data Model

The details about choosing particular visual encodings and how to build the basic data model as intuitive as possible are presented below.

Visualizing Net Asset Value

The volume of the sphere is a reasonable and intuitive way to represent a mutual fund's net asset value (NAV). However, the characteristics of real data indicate that NAV cannot be mapped to volume directly, for example, because of scaling. Small spheres will be occluded by several extremely large spheres, thus destroying the delicate sense of the entire market. According to the present invention, a Log function is assigned to the NAV of each mutual fund. Using the Log function, small and large spheres may still be distinguished clearly from one another while the entire universe looks more in harmony.

However, it is difficult to compare the volume of two spheres which are both small or both big when they are distributed in a 3D space. Issues can include how to "distribute" these spheres and what is the meaning of their position in the universe? The system and method of the present invention addresses these issues as explained below. First, a center point of the universe is added. The distance from a sphere to the universe center is based on the volume (i.e., NAV of the mutual fund) of the sphere. Larger spheres are further from the universe center. However, if NAV is mapped to the distance directly, many small spheres will stay close to the universe center, while the largest sphere will be too far away that cannot be shown on the screen (the largest ratio is about 1000:1). The large space between small and large spheres will be empty, making the universe unacceptable. The system and method of the present invention make use of the basic formula, which calculates distance from the mutual fund to the universe center:

$$D = \sqrt[3]{\frac{3V}{4\pi}}$$

Here V is the net assets of a mutual fund. D is the distance from the mutual fund to the universe center.

The system and method of the present invention calculates the radius of the baseline sphere with following formula:

$$R = \sqrt[3]{\frac{3\text{Avg}(V)}{4\pi}}$$

Here Avg(V) is the average net assets of all mutual funds. R is the radius of the baseline sphere. For example, when the summary of net assets of all mutual funds is $10,000B and there are 20,000 mutual funds, the Avg(V) will be $500M and R will be $$\sqrt[3]{\frac{1,500,000,000}{4\pi}},$$

with the value equal to 1240. The radius of the baseline sphere and the distance from the mutual fund to the universe center will be linearly mapped to the display area in the unit of pixels. For example, the radius of the baseline sphere will be mapped to 310 pixels if each pixel presents 4.

By using this equation to calculate the distance between a sphere and the universe center, the ratio between the maximum distance and minimum distance will be reduced to about 9:1. With this transformation, the overall distribution is more reasonable for visual analytics purposes. Now, the spheres can be divided into different groups according to their distance to the universe center. For spheres in the same group, they have the same distance to the universe center and distribute on the surface of the same sphere which can be regarded as a virtual sphere.

The radius, and therefore size, of each sphere representing a mutual fund can be customizable by the system user and may be selected such that it provides good visualization results, e.g., does not hide other spheres. Under an alternative embodiment, the radius of each sphere can be mapped to a particular business meaningful parameter or another dimension of data. Different algorithms can be used to create a mapping between the radius of ball/star and a specific business meaningful parameter (dimension of data). For example, a linear mapping can be used. Alternatively, a log-linear mapping can be used if a linear mapping does not provide acceptable visualization effects.

Visual Mapping of Fund Type and Client

The spheres cannot distribute randomly on the surface since other characteristics of mutual fund data also need to be visualized. System users are familiar with the longitude and latitude when talking about spheres. The system and method of the present invention use this understanding in formulating new visual encodings. As described above, all mutual funds data are classified into seven types by their principal investments. Each type of mutual funds is mapped to different latitude intervals according to its proportion in the market. The longitude represents the client of each mutual fund. In order to give users an intuitive sense of a "virtual index," a new sphere is added in the universe. The center is the center of the universe, and the volume of this special index sphere is also meaningful. It represents the average NAV of the entire mutual fund market so that the radius of this index has the same aspect ratio as the spheres. The index can be a "benchmark," and the spheres outside the earth have higher NAV than the average value of market. Therefore, system users can compare the NAV of different mutual funds by checking their distance to the universe center and have a general idea of NAV size by checking the positional relation between the index and the center. The distance from a sphere to the universe center and the volume of the sphere both represent a mutual fund's NAV. This visualization method is called "Redundant Encoding," which can help increase accuracy and enhance perception.

Figure 4A:
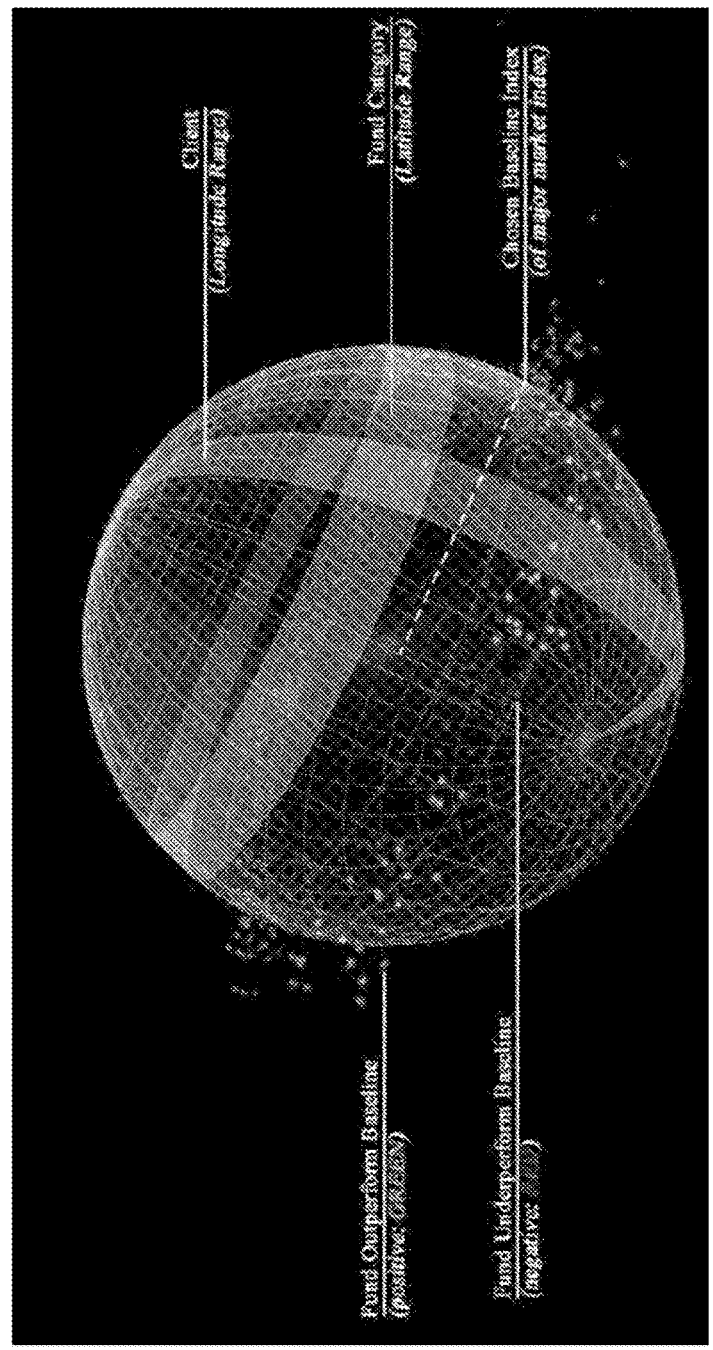
FIGS. 4A-H show representative visualizations of mutual fund data according to embodiments of the present invention.

FIG. 4A, generally at 400A, shows an exemplary visualization of a large data set according to an embodiment of the invention. As described above, the system and method of the present invention use spheres to present meta data sets, and latitude and longitude dimensions are used to distinguish points in the space. The circles that go through the two poles are lines of longitude. The circles that are parallel to the equator are lines of latitude. Every data point is presented on a big sphere (earth). For mutual fund data sets each sphere represents one fund. The radius of the sphere, color of the sphere, size of the sphere can all be used to represent mutual fund results data. Under alternative embodiments, the system and methods allow sound-based evolution visualizations. For example, the system can use an up-tone to specify that a value has increased, while a down-tone can specify that a value has increased.

In FIG. 4A, funds belonging to the same fund management company are placed in the same longitudinal sector and funds belonging to the same industry classification are placed in the same latitudinal sector. The system and method of the present invention use this novel mapping algorithm to present a precise view of the entire mutual fund industry and intuitive navigational tools to rotate, zoom in and zoom out on the universe of data.

Figure 4B:
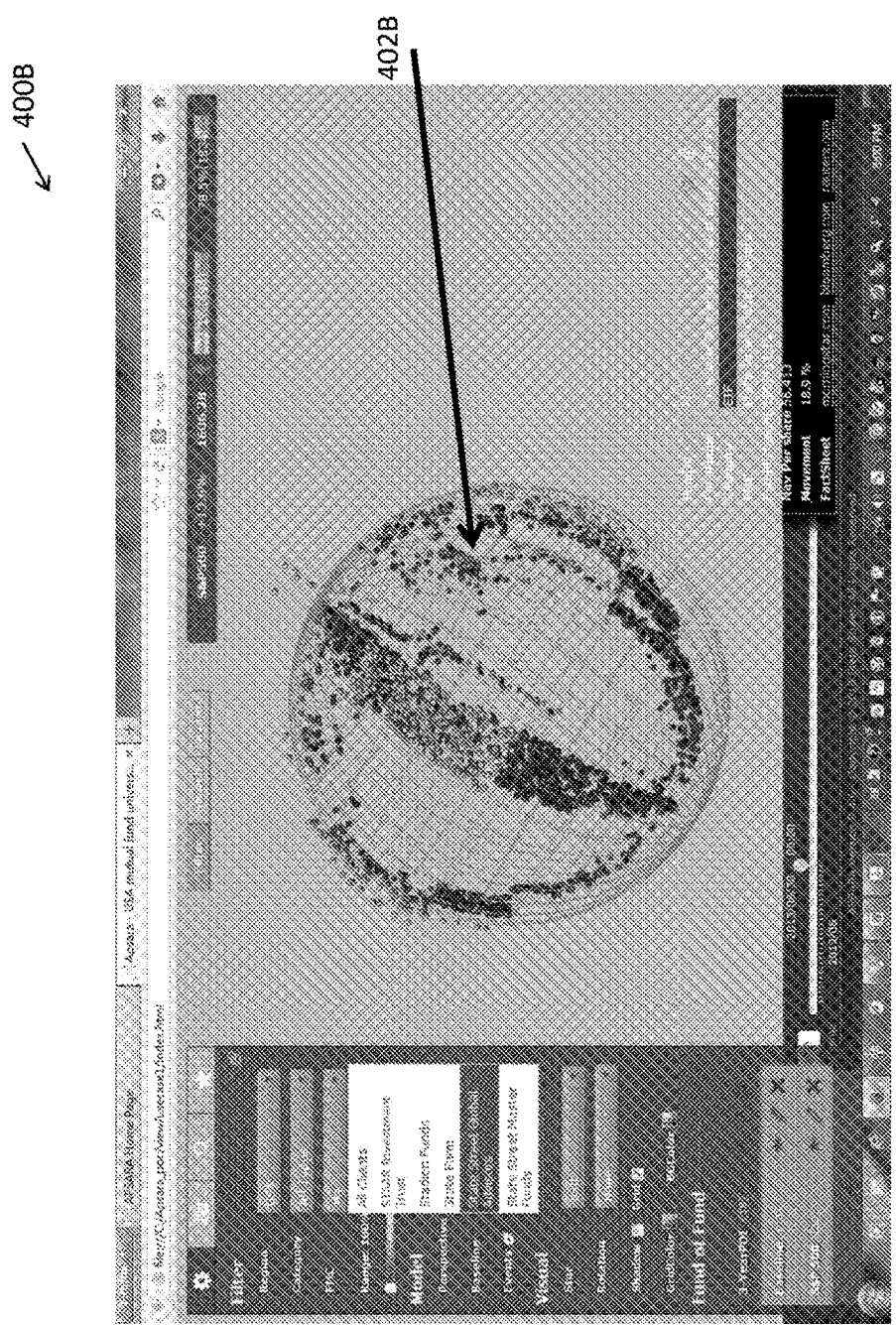
Figure 4C:
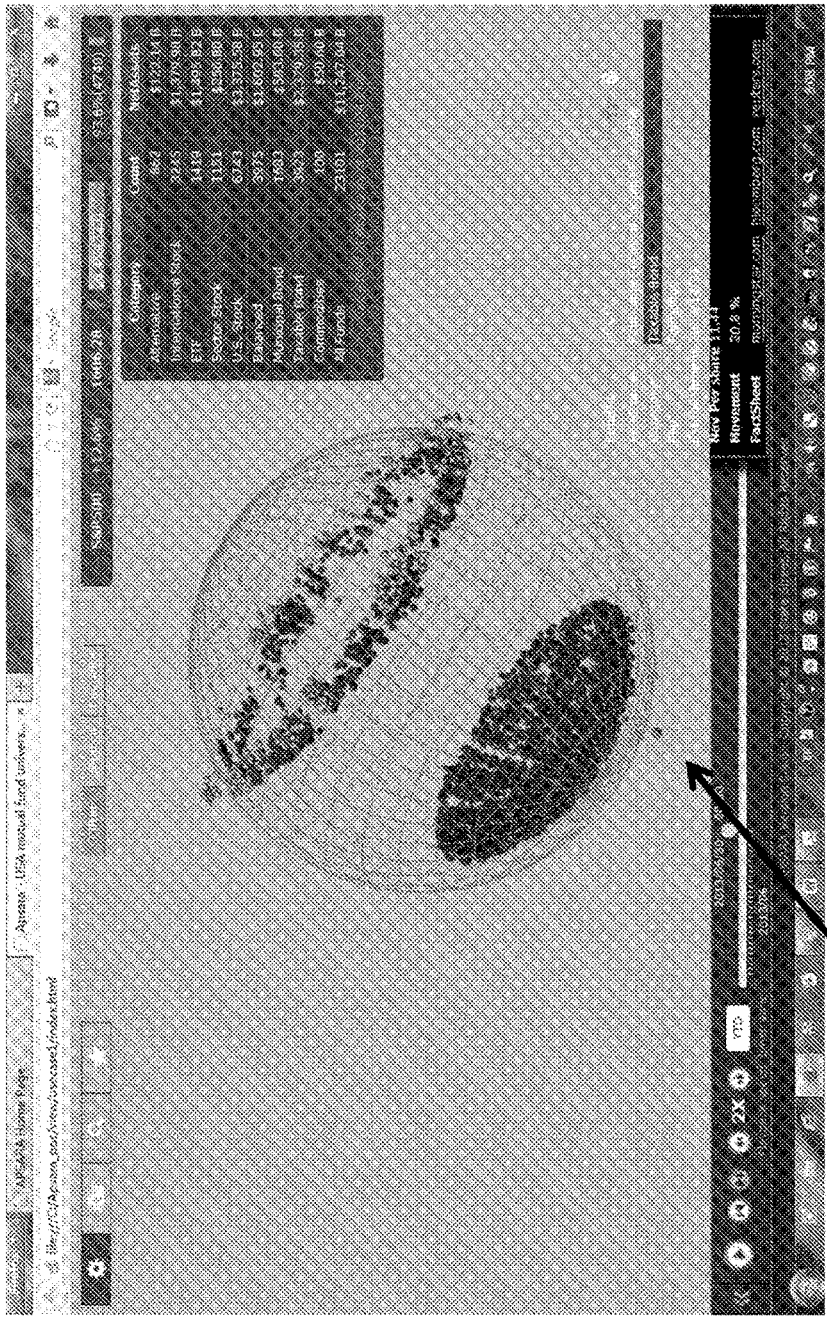

Referring to FIGS. 4B and 4C, the S&P 500 Index is used to represent the earth (baseline globe). Funds belonging to the same fund management company are placed in the same longitudinal sector, as shown in FIG. 4B, and funds belonging to the same industry classification are placed in the same latitudinal sector, as shown in FIG. 4C. For example, "Red" may be used to indicate funds that underperform and "Green" may be used to indicate funds that outperform the index (baseline globe). The funds that underperform are located within the global sphere, while funds who outperform are located outside the global sphere. The system and method of the present invention provide intuitive navigational tools to rotate, zoom in and zoom out on the universe of data.

Referring again to FIG. 4B, a system user can filter the visualization based on particular clients. For example, FIG. 4B at 402B shows funds from "State Street Global Advisors." Also, shown in FIG. 4B, is information about a fund with Fund Id XLY.

Referring again to FIG. 4C, a system user can select particular categories of funds and display the corresponding funds in the universe. For example, in FIG. 4C at 402C, it shows funds from two categories: "Sector Stock" and "Taxable Bond." As shown, at 402C, the system user has selected a particular fund with fund Id "FOCIX," which belongs to the Taxable Bond category. Inspecting the visualization of the funds of these categories, a system user can clearly observe that the funds of the "Taxable Bond" category are overwhelmingly in numbers underperform the market, as they are shown in red color and within the earth. On the other hand, the funds of the "Sector Stock" category exhibit a more balanced behavior, where a balanced number of the funds in the category outperform and underperform the market.

Figure 4D:
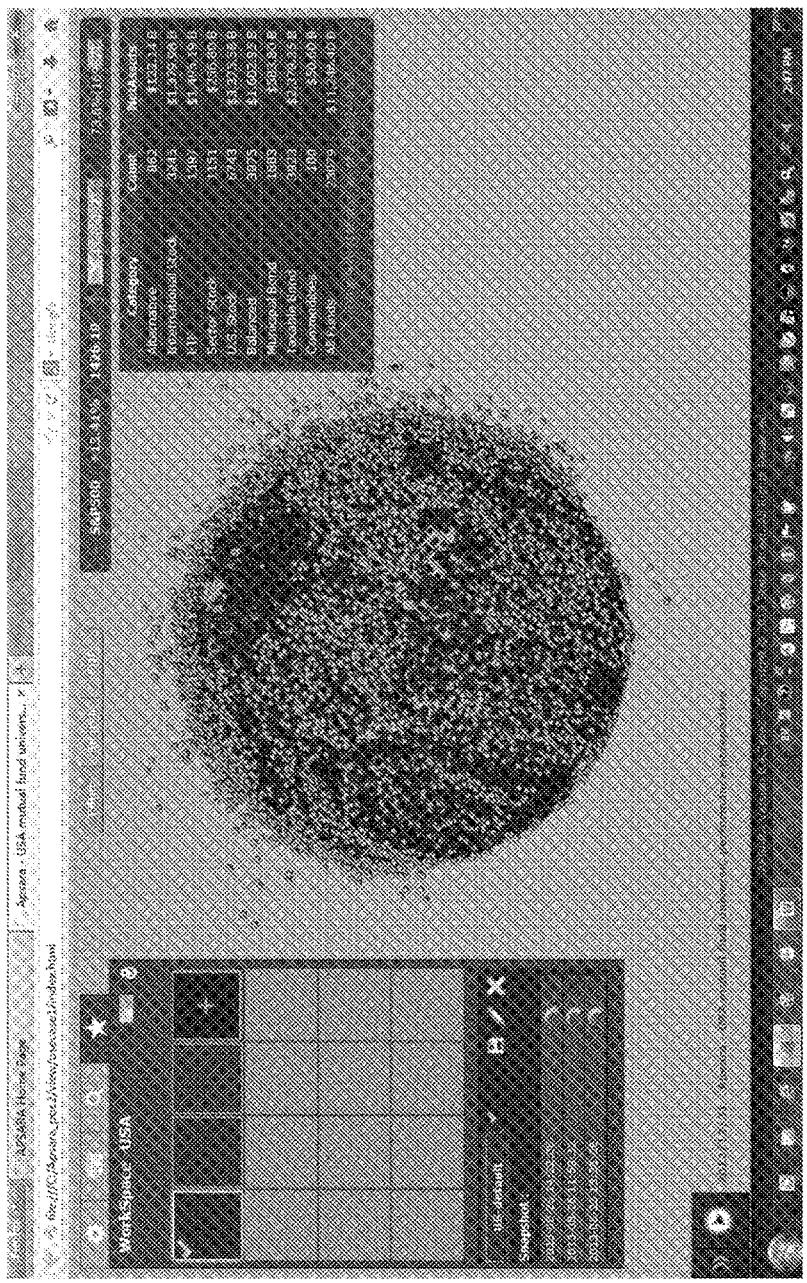
Figure 4E:
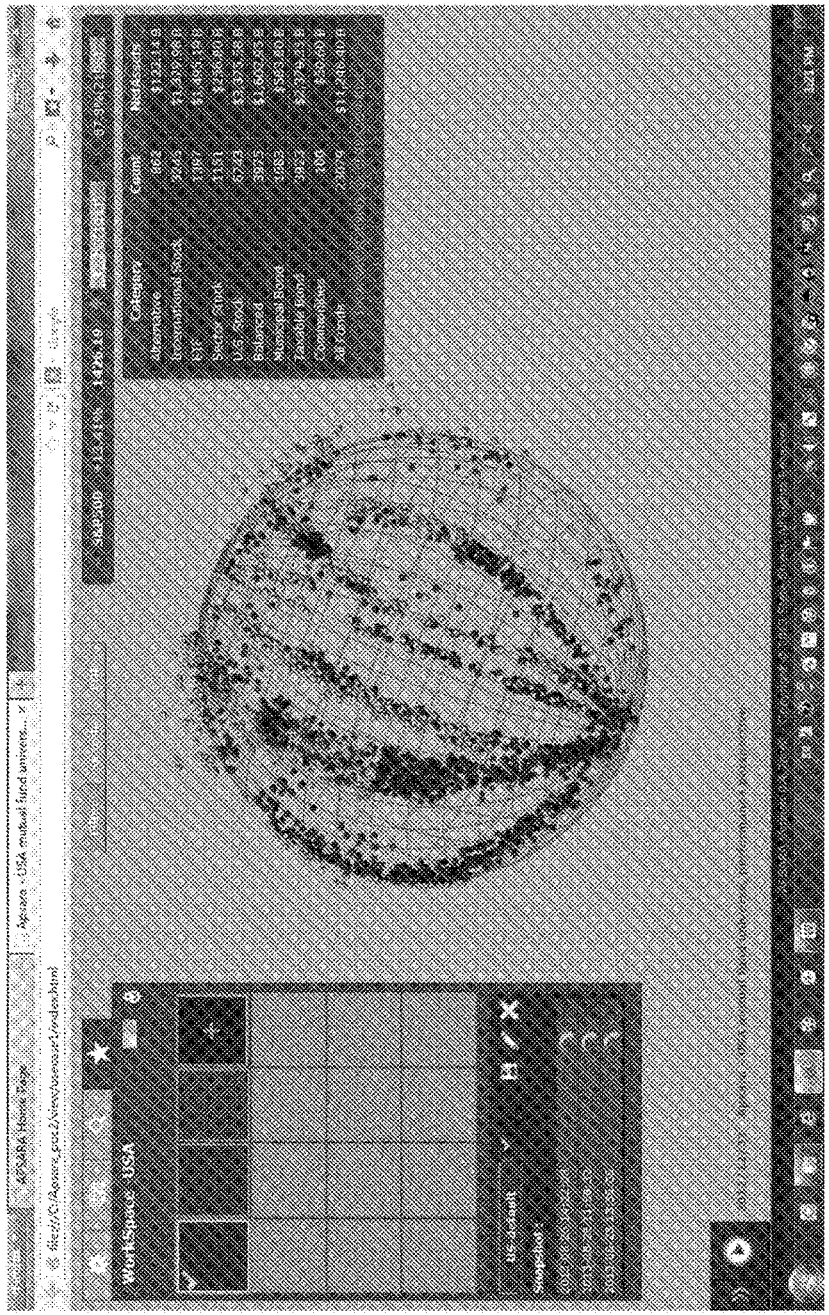
Figure 4F:
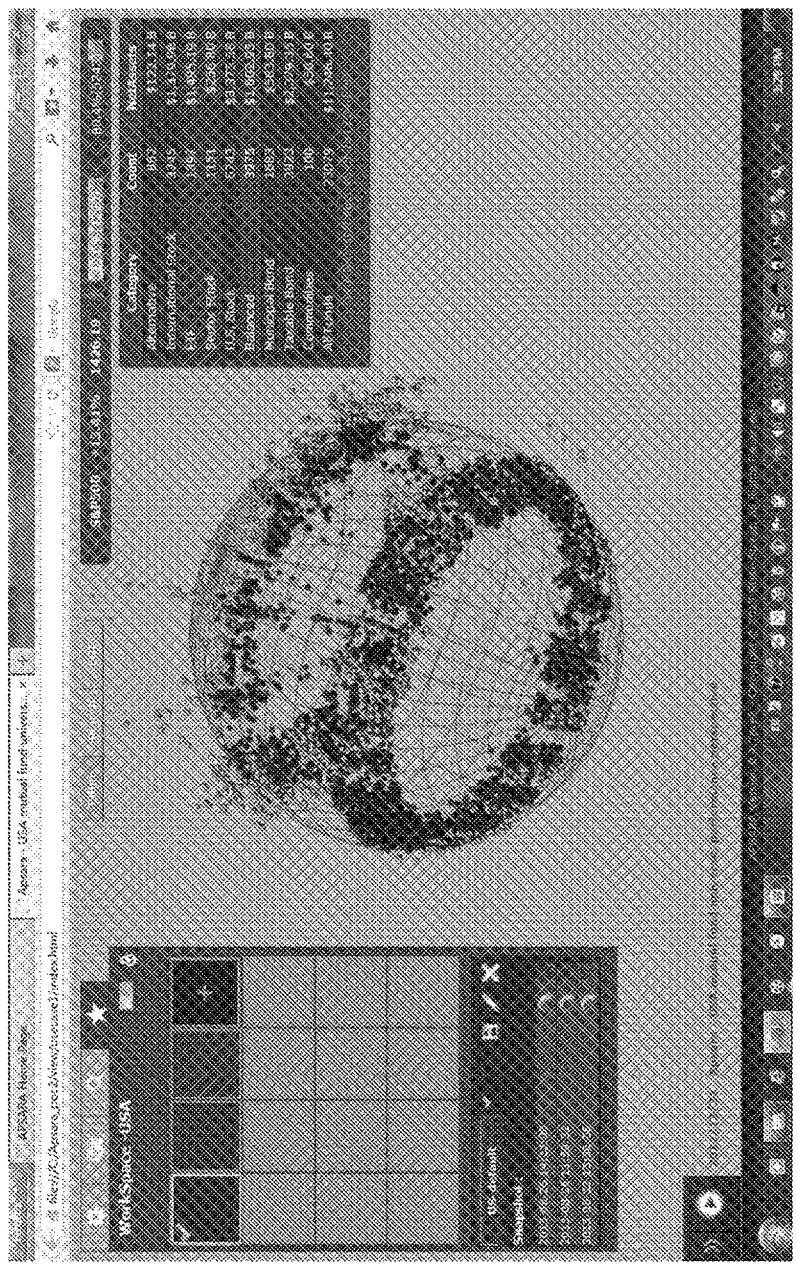
Figure 4G:
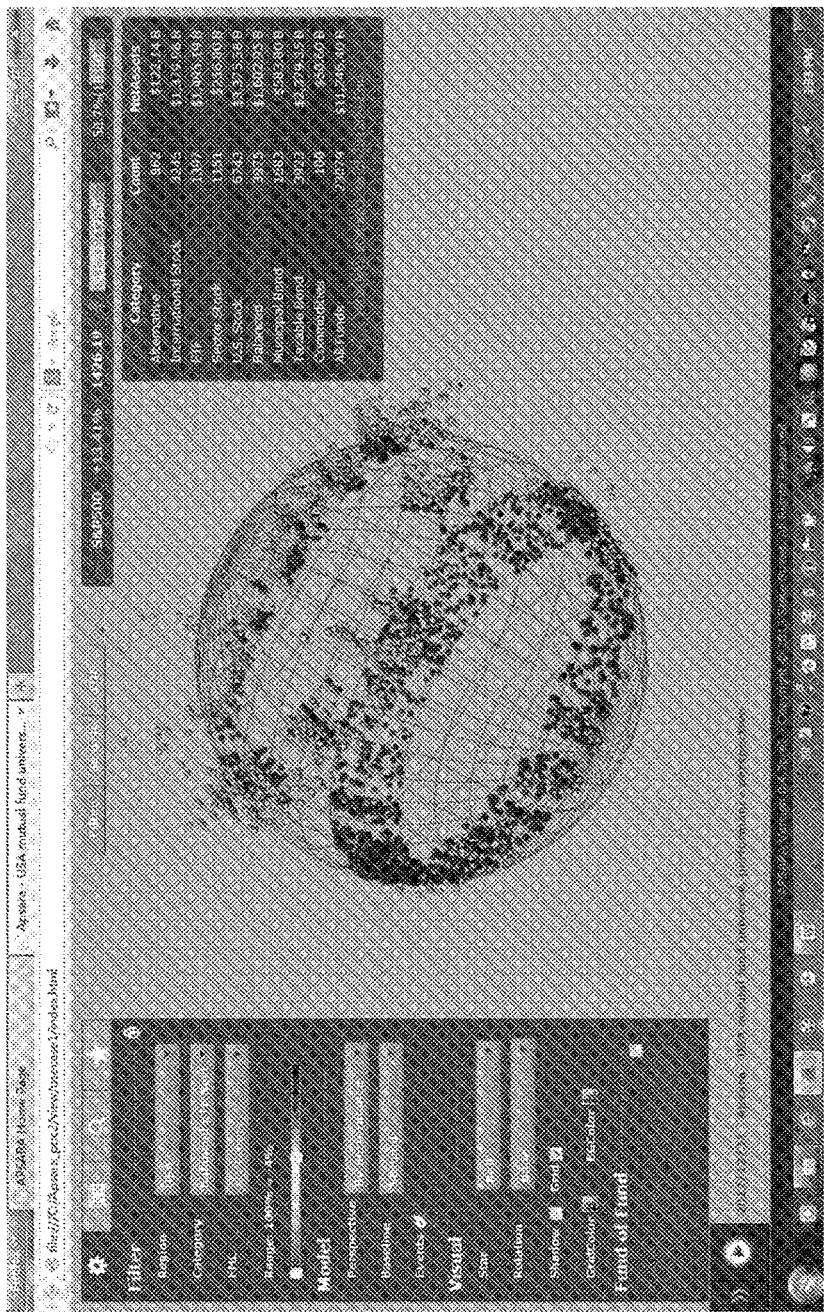
Figure 4H:
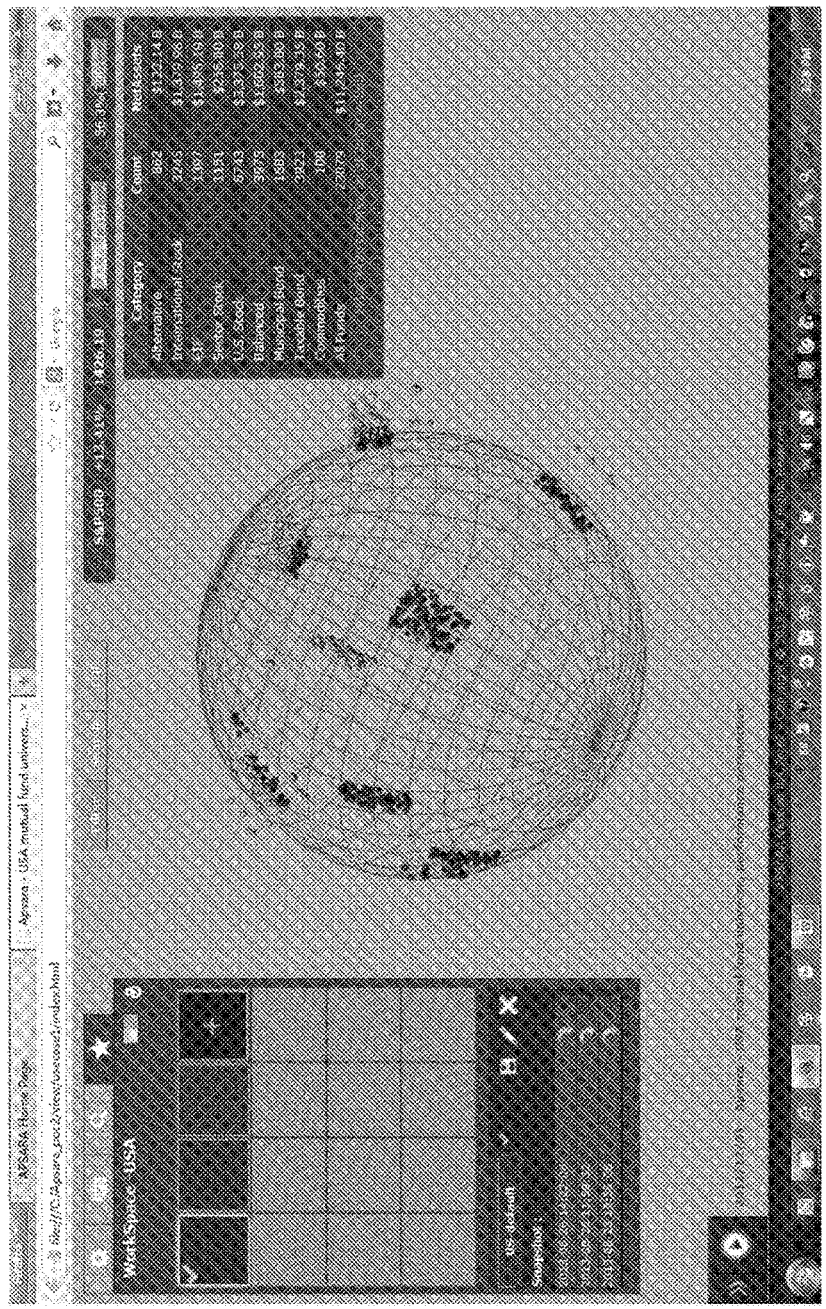

Referring now to FIGS. 4D-H, additional filtering interactions are presented. FIG. 4D shows the default workspace initialized with the complete universe of data. FIG. 4E shows a longitude filter by selecting the names of several fund management companies. FIG. 4F shows a latitude filter by selecting the names of several categories. FIG. 4G shows a range filter on FIG. 4E using the range control user interface. FIG. 4H shows a complete cross-filtered view using longitude, latitude and range.

Multiple workspaces allow a user to name and identify separate research data sets. For example, the visualization in FIGS. 4D-H corresponds to a system user-defined workspace, which corresponds to the US mutual fund industry. As explained above, the ability to filter large data sets along longitude, latitude, and a range (distance from center) is an aspect of the interactive visual analytics system and method of the present invention. The workspaces can be created with filtering information from the selection of longitude data (Fund Company), latitude data (category) or range. The ability to filter information on latitude, longitude and range from is called "cross-filtered" views.

Figure 5A:
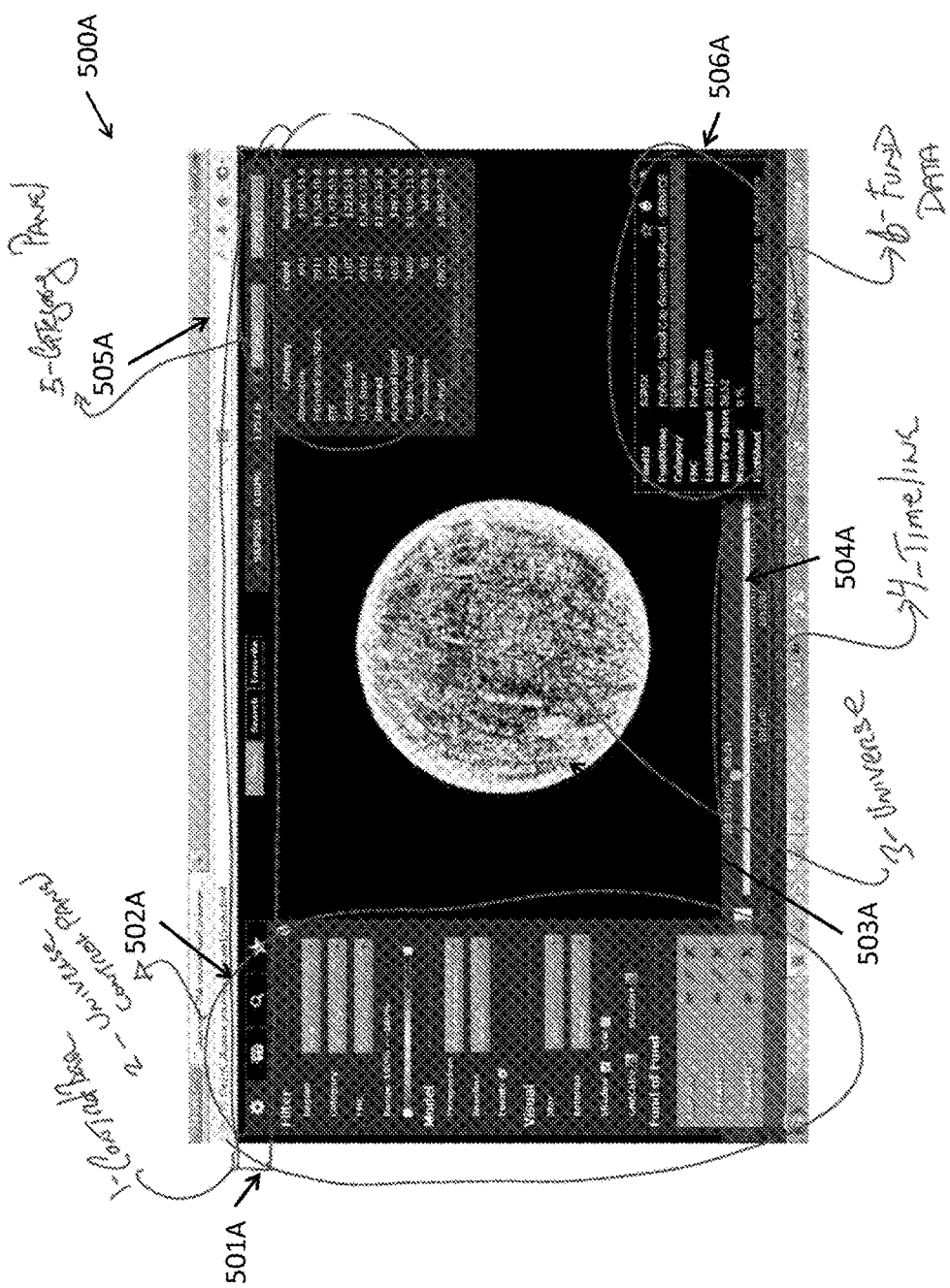
FIG. 5A-5D show representative visualizations of a universe workspace according to embodiments of the present invention.

Referring to FIG. 5A, generally at 500A, an exemplary visualization of a data set is shown, where the universe workspace 500 is selected for display. The universe workspace is shown to contain six visual elements for analyzing the mutual fund industry: a control bar 501A, a universe control panel 502A, the universe of the data set 503A; a timeline scroll bar 504A, a category panel 505A, and a Selected Fund Data Panel 506A.

Figure 5B:
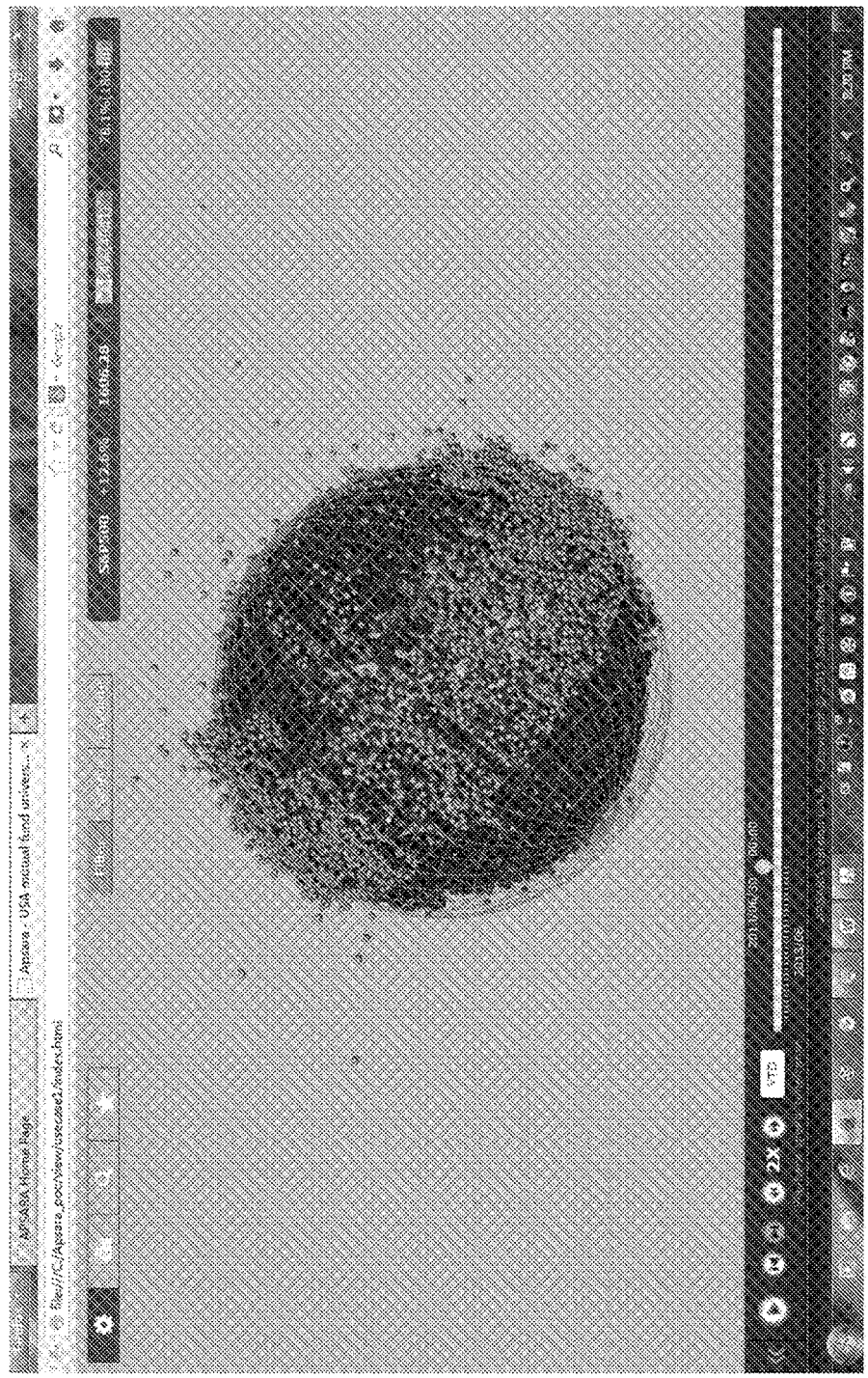

FIGS. 5A-B present the entire US fund industry in a single geometry based on a universe of spheres. As described above, each sphere represents a fund data point and is enhanced by size, color, motion and sound. The current sample universe shown in FIG. 5A begins on Dec. 31, 2011. At that time the US Mutual Fund Industry had ~765 Fund Management Companies, ~21,000 Fund share classes with total assets of 9.8 trillion. At that time, all spheres are displayed on the surface of the earth. The sample universe ends Jun. 30, 2013 with more than 23,000 fund share classes and 11 trillion in assets and is shown in FIG. 5B. Different colors can show performance of the different mutual. For example, in FIG. 5B, funds that outperform the baseline can be displayed in a first color, for example, green, and are shown outside the baseline sphere. Funds that underperform the baseline can be displayed in a different color, for example, red, and are shown inside the baseline sphere.

Figure 5C:
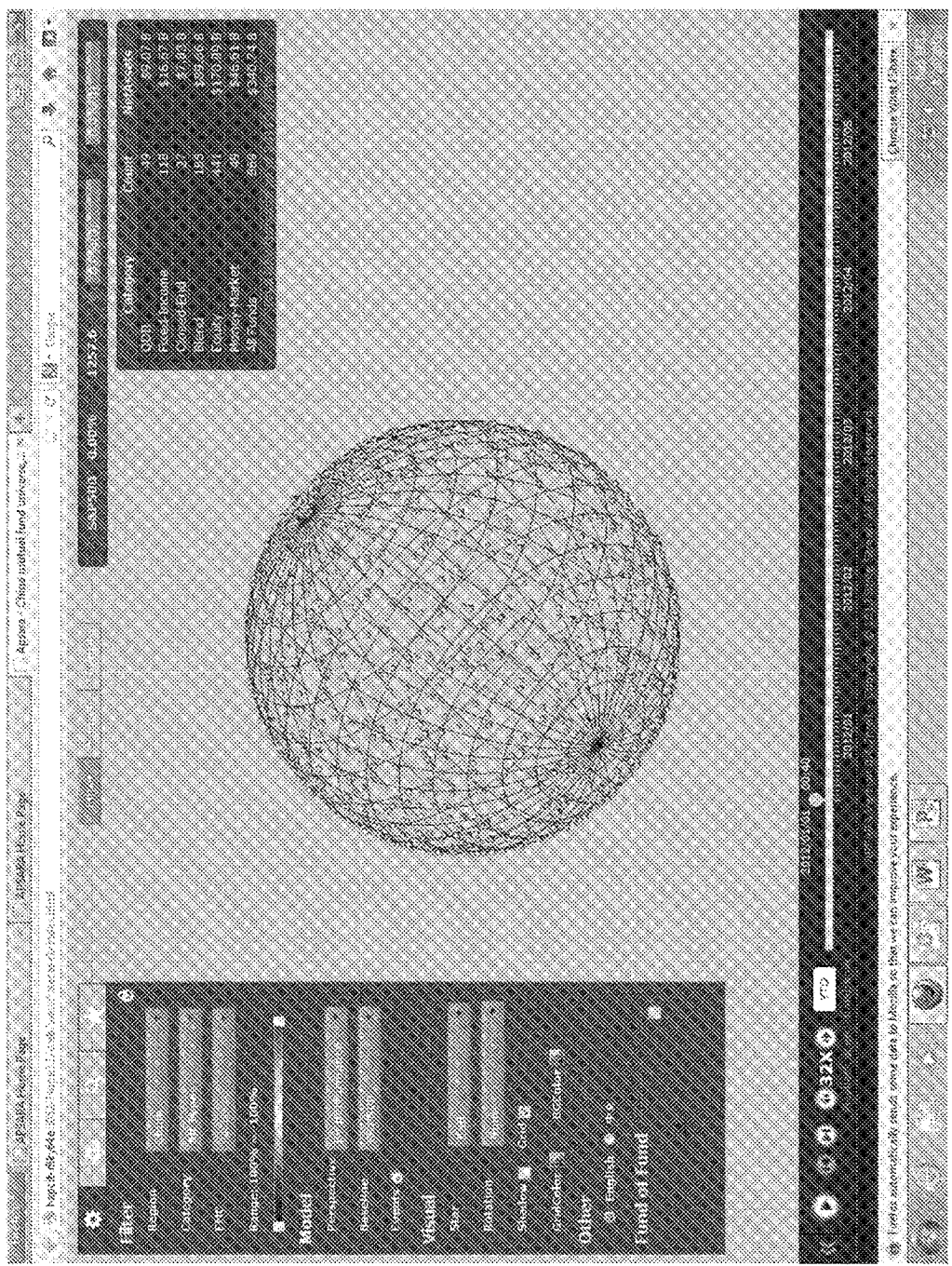
Figure 5D:
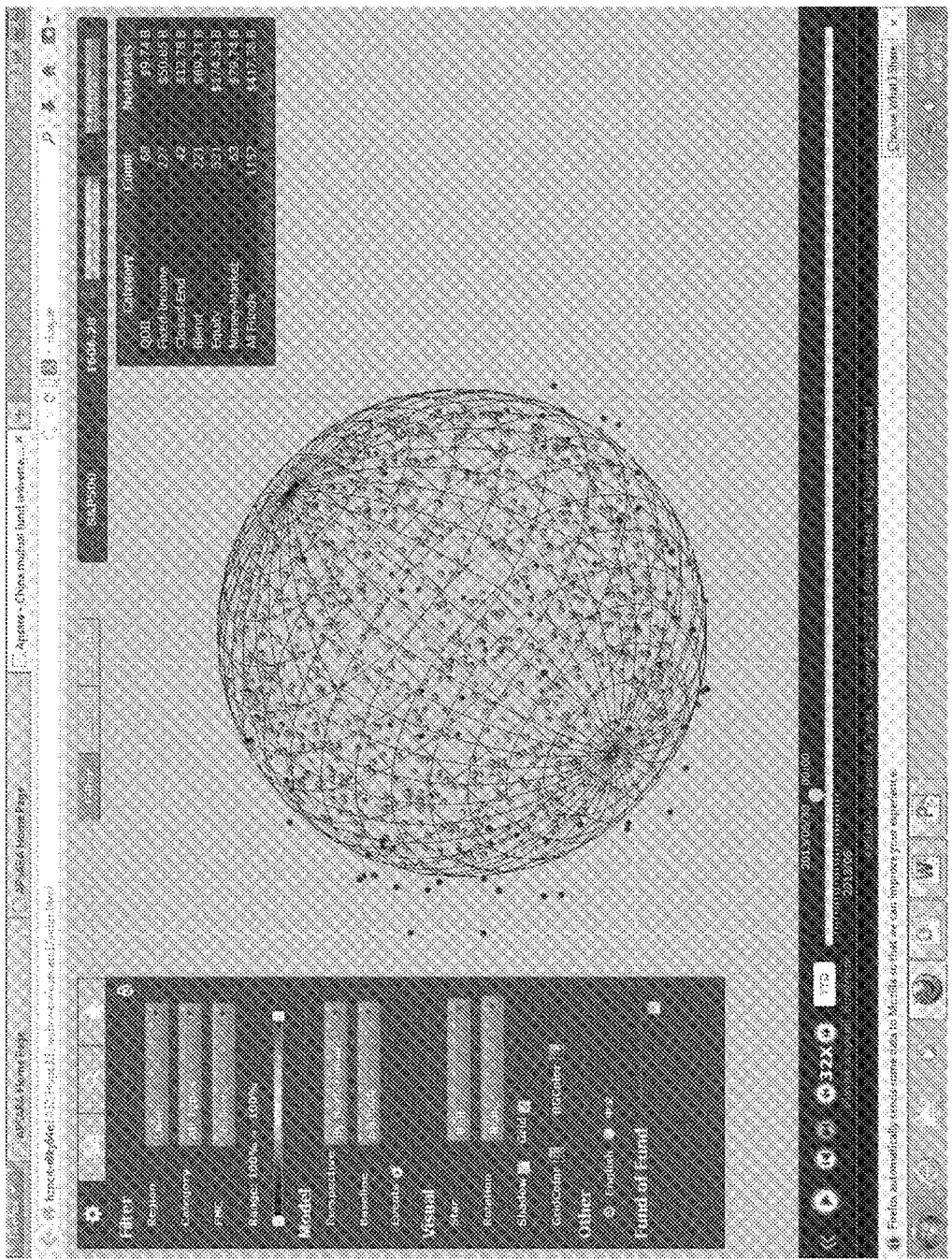

Referring now to FIGS. 5C-D, the entire China fund industry is visualized in a single geometry based on a universe of spheres at two different that time periods. In FIG. 5C all of the mutual funds are placed at the surface of the global sphere. FIG. 5D shows the distribution of those funds inside and outside of the global sphere based on performance at this later time snapshot.

Figure 5E:
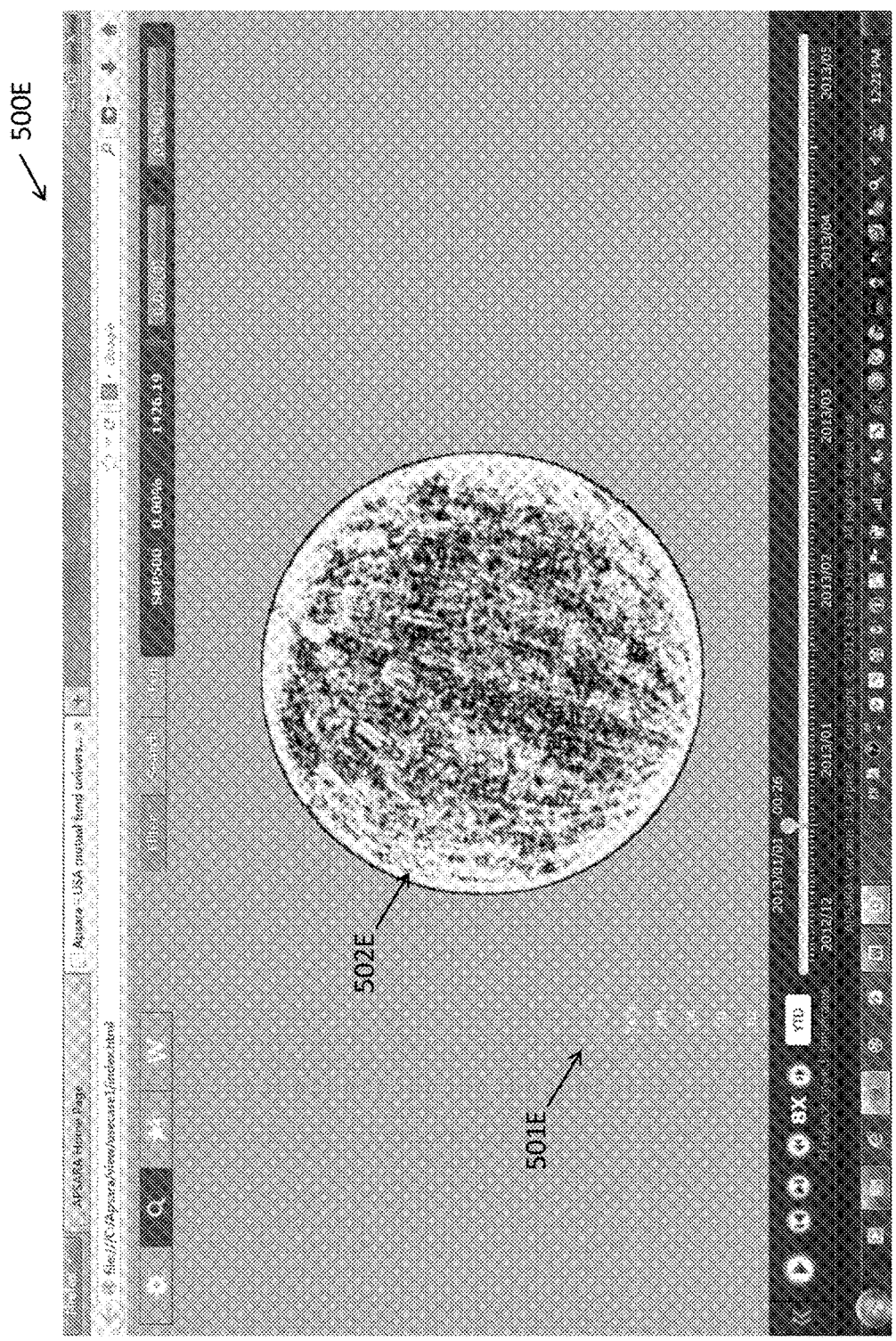
FIG. 5E-5H show representative visualizations of the timeline aspects of the present invention.
Figure 5F:
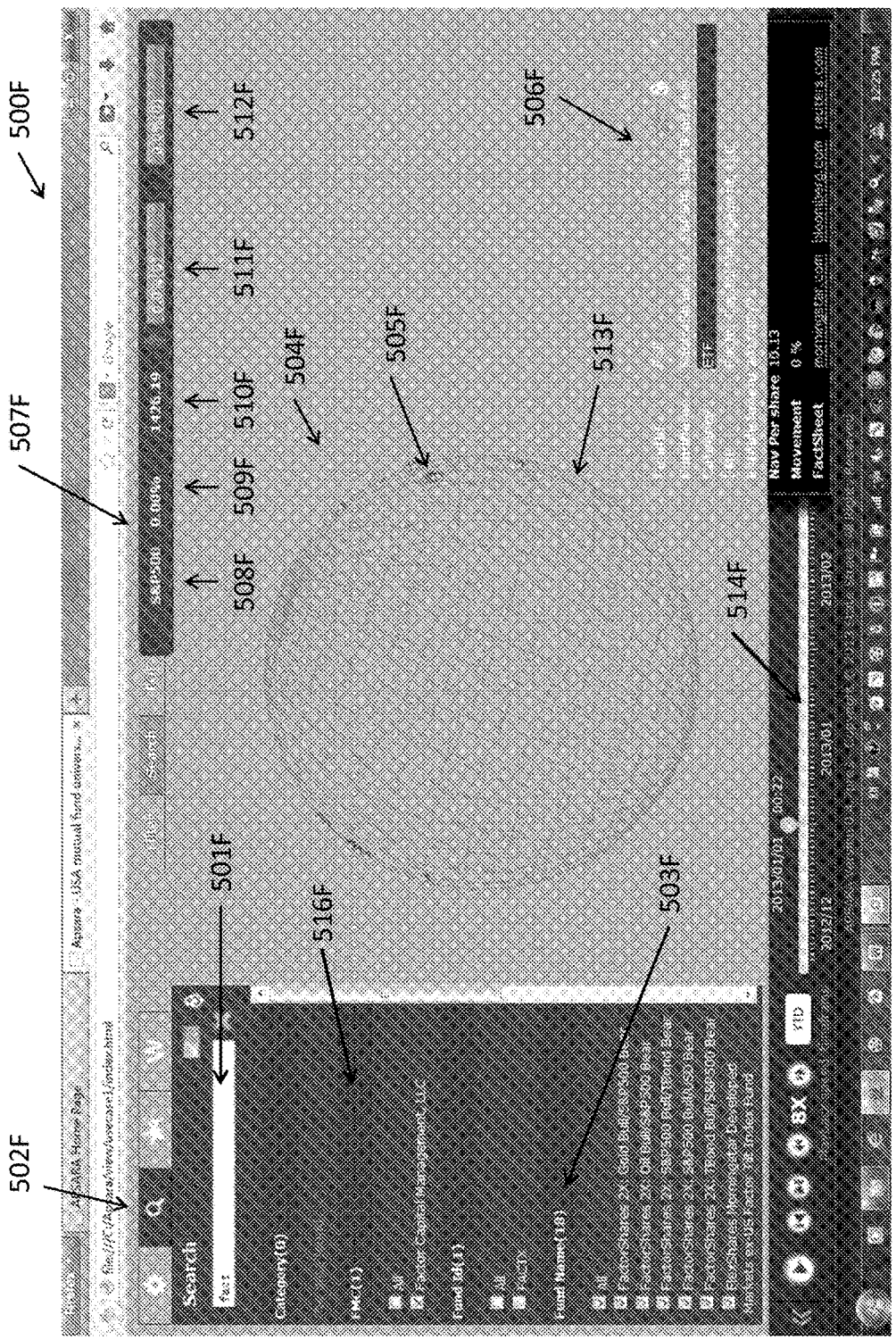

FIG. 5E, generally at 500E, shows an exemplary visualization of the entire US funds industry, where time period for the analysis is set to be year-to-date (YTD) 501E. Therefore Jan. 1, 2013, sets the start time $T^0$ of the universe. At start time $T^0$, as explained above, all funds are displayed on the surface of the baseline sphere and have the same color, for example, yellow 502E. In FIG. 5F, generally at 500F, the system user using search field 501F of search tab 502F, can search for funds containing the term "fact." In response to the search, the system will filter all non-responsive funds, and will only display the funds that were identified in the search. In the visualization of FIG. 5F, there are eighteen funds returned as shown in the Fund Name results area 503F and there one fund management company (FMC) returned as shown in the FMC results pane at 516F. These funds are shown in the universe 504F.

The system user can further select a particular fund from the eighteen funds. For example, the user can select the fund with fund id "FSE," and the sphere that corresponds to the fund can be visualized in a different color, for example, blue and can be displayed in an enlarged sphere compared to the spheres that correspond to the unselected funds. Details of the selected fund can also be displayed in window 506F. For example, window 506F can provide the fund ID, the fund name, the fund category, the fund management company, the establishment date of the fund, the fund NAV per share, the fund movement, and associated fact sheets. The status of the index, for example, the S&P500 index is shown in area 507F. Area 507F shows the name of the index 508F, the percentile change of the index from the selected start time 509F, the index value 510F, percentile and absolute number of the funds the over-perform 511F, and the percentile and absolute number of the funds that underperform. As expected, since the visualization of FIG. 5F corresponds to the start time $T^0$, the index percentile change 508F is at 0%. In FIG. 5F, the radius of the baseline sphere 513F corresponds to the index number 510F, at the particular point in the timeline. The timeline 514F points to the corresponding time. As shown in the timeline, time is set on Jan. 1, 2013.

Figure 5G:
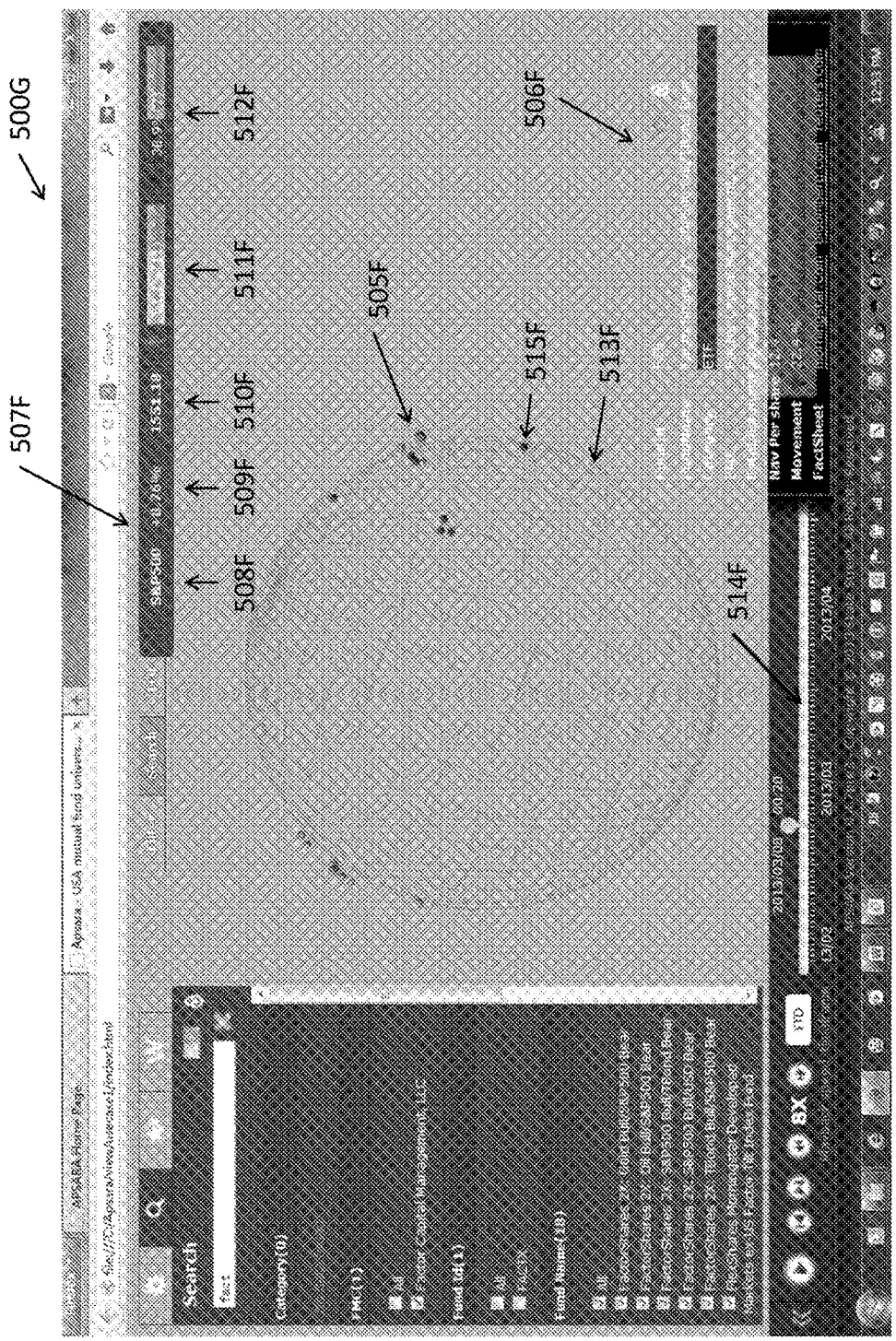

FIG. 5G, generally at 500G, shows the evolution of the data set at time $T_1$. The selected fund's performance 505F outperforms the baseline and is positioned outside the baseline surface 513F. FIG. 5G, also shows that the index has increased by 8.76% 509F to a value of 155.18 510F. The index increase is also indicated by a larger radius of the baseline sphere 513F, compared to the radius of the baseline sphere 513F in FIG. 5F. FIG. 5G also shows that eleven of the eighteen selected funds or 61.1% over-perform the baseline 511F, while the remaining seven underperform the baseline 512F. The eleven funds that over-perform are displayed in green and the seven that underperform are displayed in red. Area 506F provides current information about the selected fund. For example, the NAV per share has been updated to a value of 12.4 to correspond to the current time, which is Mar. 8, 2013, as shown in the timeline 514F. The movement value has been updated to the value of 22.4%. FIG. 5G also shows fund 515F displayed in red, which reveals that it underperforms the baseline index.

Figure 5H:
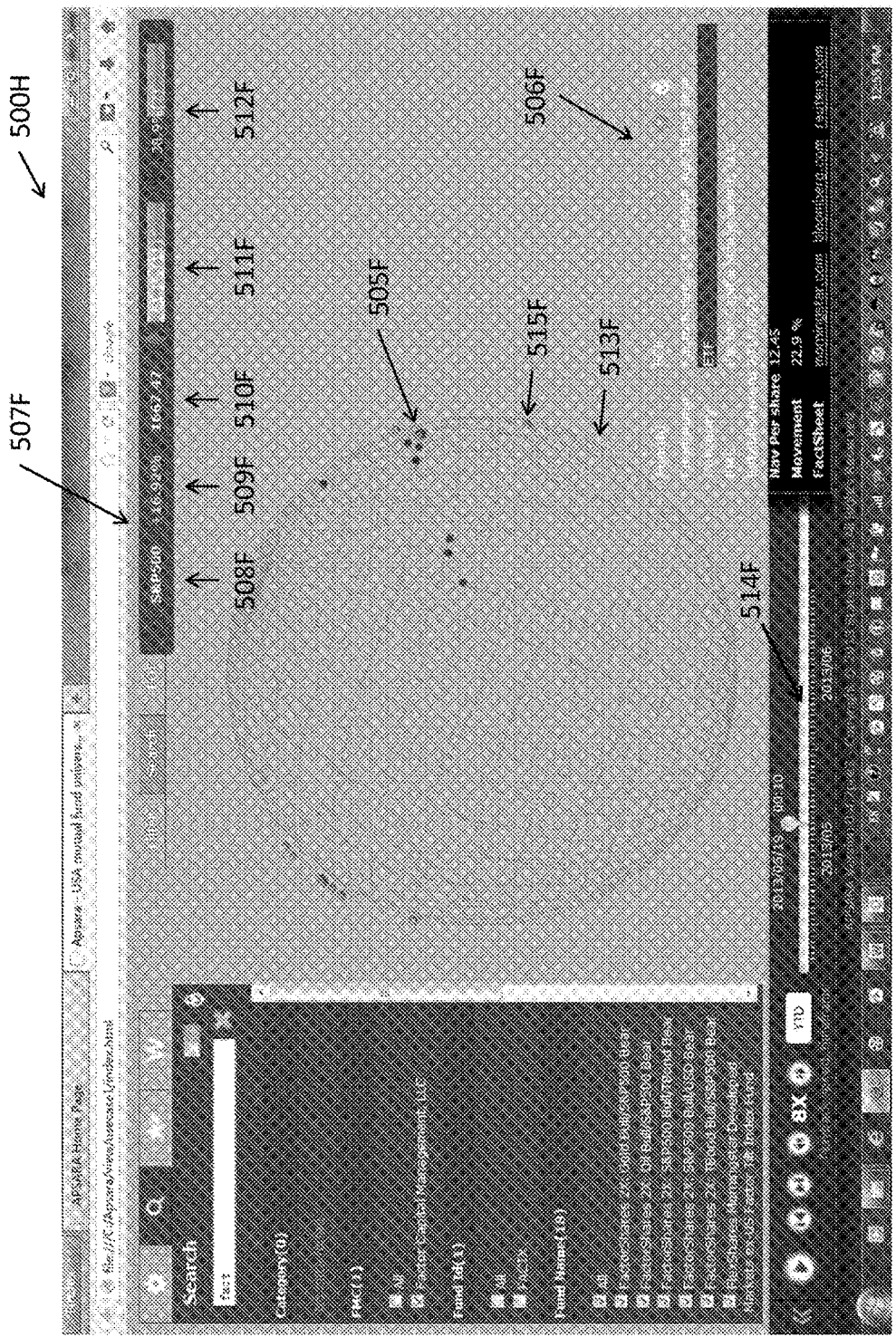

FIG. 5H, generally at 500H shows the continued evolution of the selected fund at time $T_2$ and the selected fund's performance. Area 506F provides current information about the selected fund at time $T_2$. For example, the NAV per share has been updated to a value of 12.45 to correspond to the value on May 19, 2013 as shown in the timeline 514F. The movement value has been updated to the value of 22.9%. Fund 515F, which underperformed at time $T_1$, and was displayed in red, now is shown to over-perform the baseline, and therefore, is displayed in green.

Figure 6A:
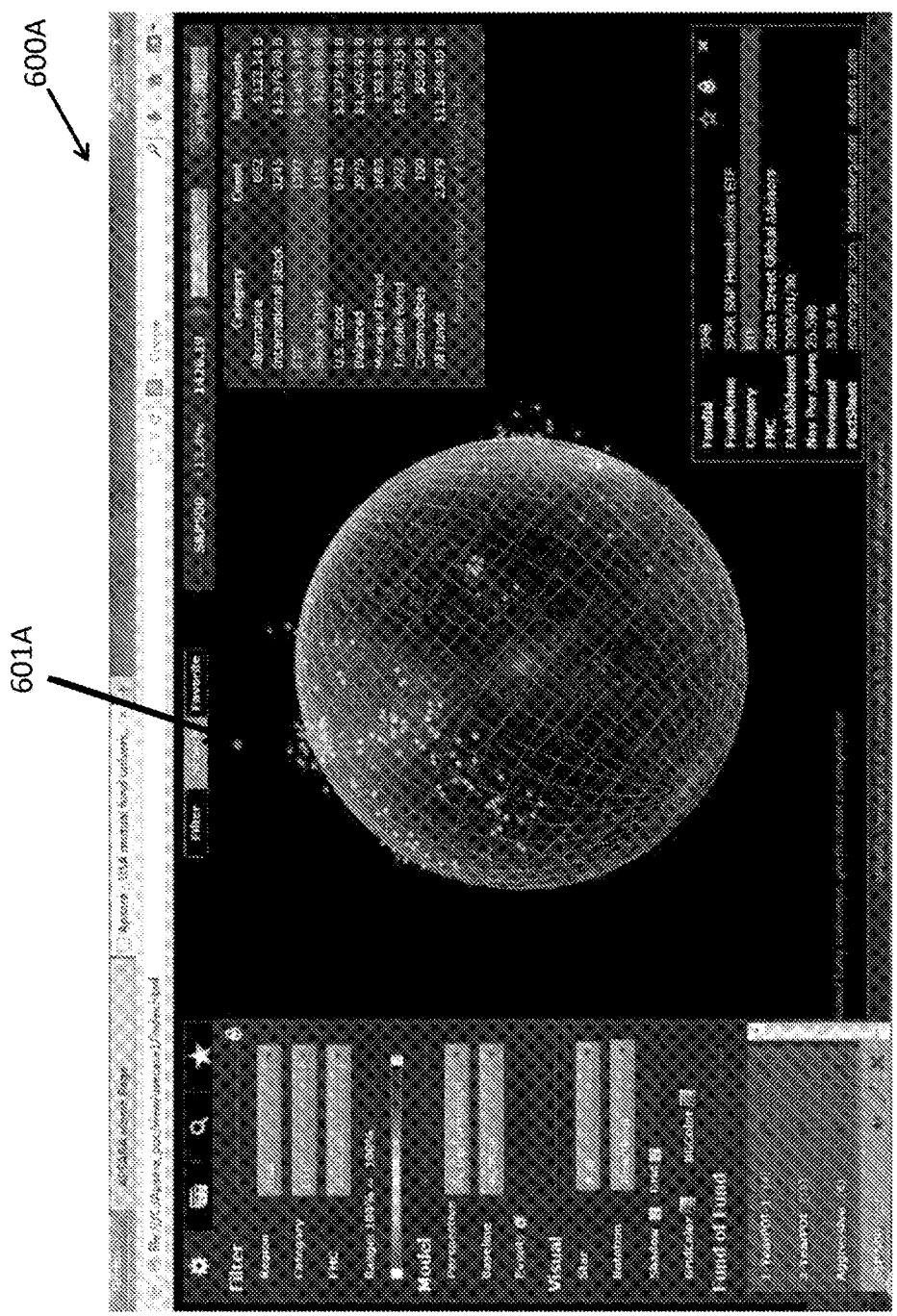
FIGS. 6A-B show representative visualizations of a search space according to embodiments of the present invention.

Referring to FIG. 6A, generally at 600A, an exemplary visualization of a data set is shown, where the search workspace is selected for display. A particular fund 601A is selected, which can be visualized in the workspace with a different color than other funds, for example, a blue color.

Figure 6B:
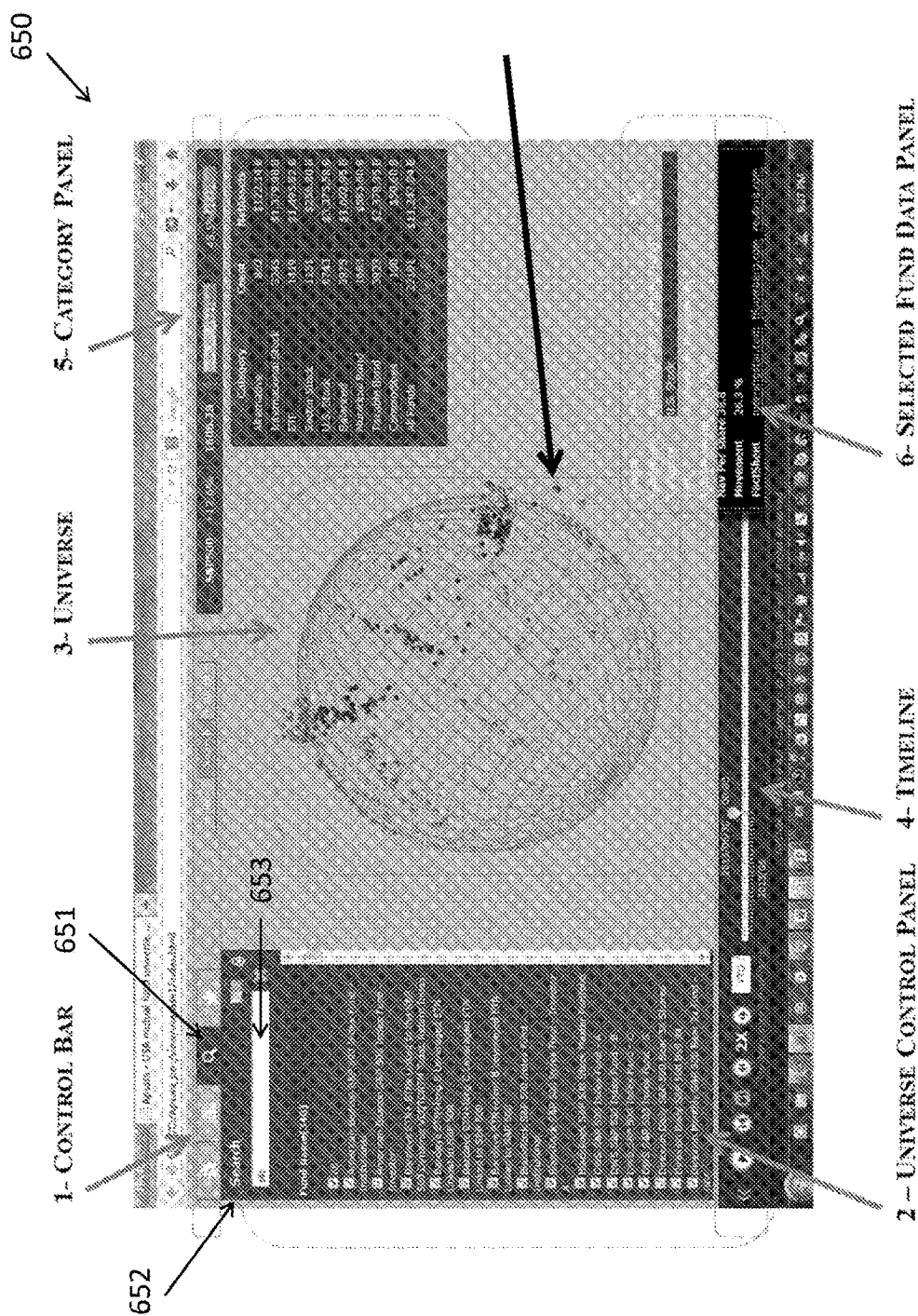

Referring to FIG. 6B, generally at 650, another exemplary visualization of a data set is shown, where the search workspace 650 is selected for display. As seen in FIG. 6B, when the system user selects the "search" tab 651, a search dialog 652 is displayed, where the system user can start typing the name of a particular fund in the search field 653. In the particular example, the user has typed "s&p." The search results are displayed in the search dialog 652. The system can match the entered string in the search field with fund names or any metadata that has been provided from the data vendors of the data.

Visualizing Growth Rate and Volatility

According to the present invention, the growth rate and volatility of mutual fund can be visualized in the universe. Since mutual fund data is time-series data, both growth rate and volatility are highly related to time. In order to visualize the change of mutual fund market over time, a time axis is added at the bottom of the universe. For a single sphere, when users drag the time axis, it will move according to the change of its NAV. For example, in year 2011, a fund has higher NAV than the average value of the whole market and it will stay outside the virtual earth. As explained above, the virtual earth represents any index that a system user may choose. If in year 2012, the fund's NAV shrinks below the average value, then it will move inside the virtual earth. So system users can have a general idea of growth rate and volatility by checking the sphere's movement speed and range. Traditionally, Mutual funds are often compared with a stock market index, such as the "Dow Jones Industrial Average" in USA and the "Shanghai Composite Index" in China. The growth rate of a mutual fund is depicted by the sphere's color. For example, in the disclosed methods and systems, when visualizing China mutual fund data, red color indicates spheres that outperform the market while green color indicates spheres that underperform the market. However, over performing and underperforming may be represented in many different ways and still be within the scope of the present invention.

This exemplary data model is aimed at common characteristics of single mutual fund data which can be visualized by traditional 2D charts as well. However, the system and method of the present invention is able to present all mutual funds data on the same screen (i.e. the 3D universe), offering a compact overview of the whole mutual fund market while retaining the information of a single mutual fund as specific as possible.

Customizable Visualization

Figure 7:
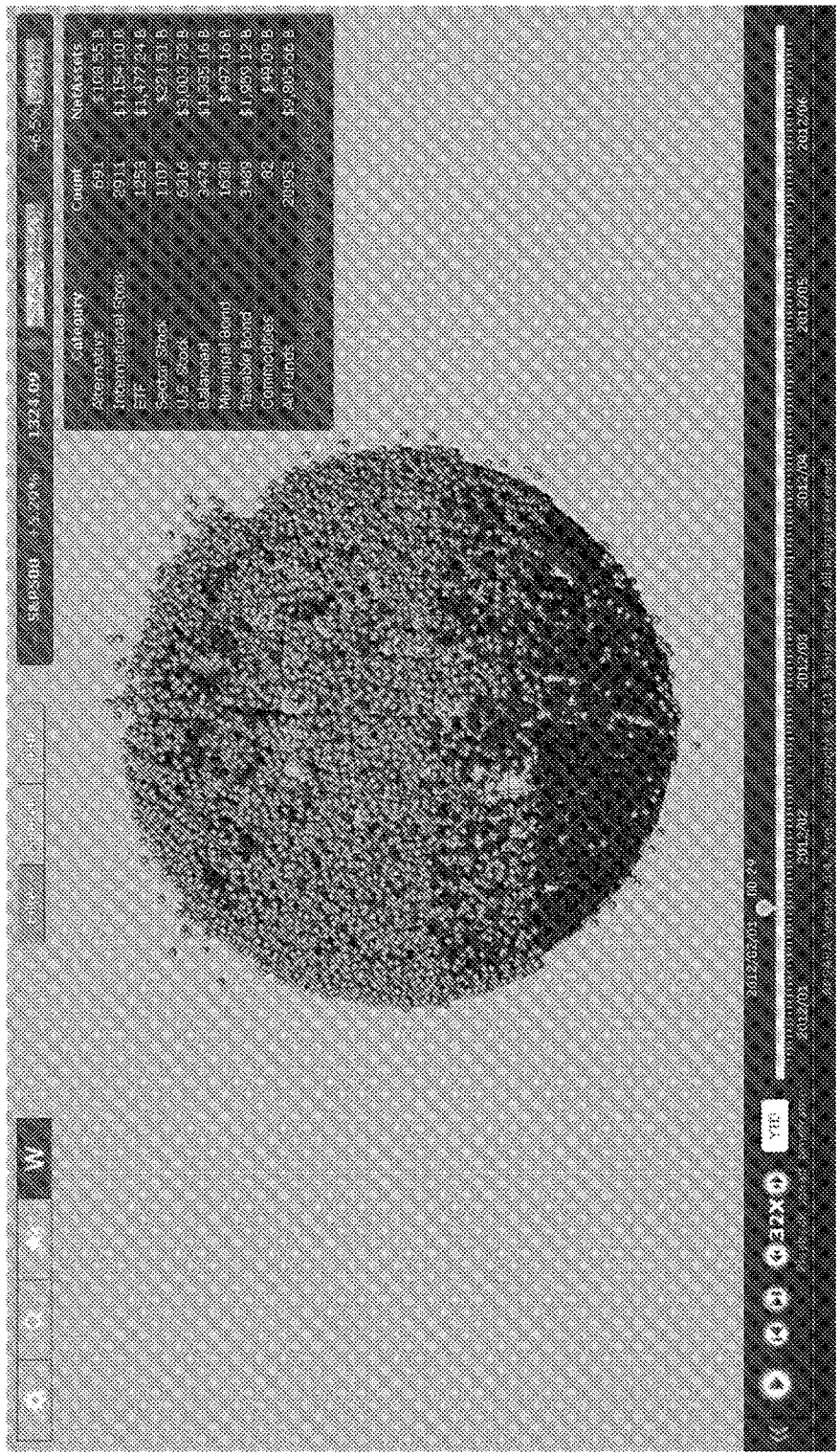
FIG. 7 shows a representative data model for visualizing growth rate of mutual funds in the US market according to embodiments of the present invention.

The data model described above has mainly focused on the visualization of the fund NAV. However, it does not provide information of the fund's growth rate compared to a certain day in the past. Referring to FIG. 7, generally at 700, the particular data model shown is designed to represent the growth rate of mutual funds. In this model, the distance from a sphere to the universe center can be calculated by the equation below:

$$R=(1+c)*\alpha, c \in [-1, +\infty)$$

R is the distance and c is the growth rate of a mutual fund compared to a certain day in the past. Since the growth rate can be negative while negative distance cannot be visualized in the universe, all growth rate values are added by 1 to guarantee the value is always non-negative. Then, it is multiplied by a constant number "$\alpha$" (default value is 200) to expand the distance so that the universe looks more reasonable. In this model, the "benchmark" (i.e. the virtual earth) no longer represents average NAV of market. Now, it represents the growth rate of stock market index (such as "Dow Jones Industrial Average" in USA) compared to a certain day in the past. The new equation to calculate the earth radius is the same with mutual fund spheres. In this way, users can easily compare mutual funds' performance with stock market index by checking the position of the spheres. Spheres outside the earth outperform the market while spheres inside the earth underperform the market. Green and red colors are also used to enhance perception as described above.

As discussed above, the data model of FIGS. 5A-B visualizes the growth rate of mutual funds in US market. While the Index is growing up, most spheres with low latitude are red, which means that they underperform the market. By interactive analysis according to the system and method of the present invention, it is found that the type of "Debt Fund" account for majority of the red spheres shows that Debt Fund is less affected by stock market.

Application Examples

The discussion below presents two representative examples that involve real data from both China and US mutual fund markets. The first example shows the evolution of China's mutual fund market in year 2012 with interactive operations. The second example demonstrates the capability of the system and method of the present invention to forecast the development of China QDII.

Visualizing Mutual Fund Market

Figure 8:
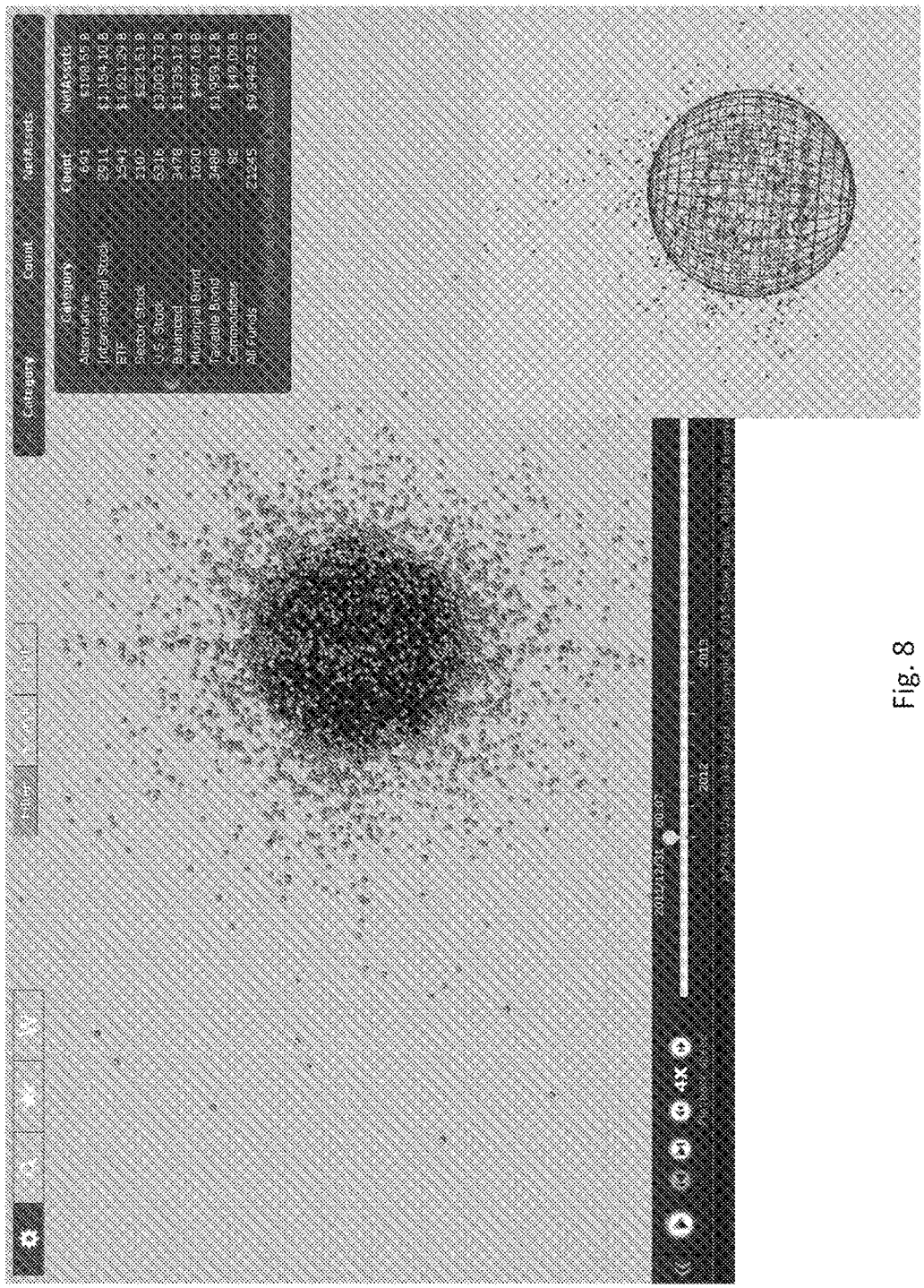
FIG. 8 shows a representative visualization of the overview of the US mutual fund market in year 2012 according to embodiments of the present invention.

The discussion above described how mutual fund data is retrieved from different data sources. FIG. 8 presents an overview of the US mutual fund market in year 2012. The lower right corner shows the year 2012 universe of China market for comparison. After pre-processing and integrating, these real mutual fund data is applied to the system. There are 21,686 funds from USA and 869 funds from China. While USA has far more funds than China, the difference in the depicted earth radius, when the radius represents the average NAV, is small because it is adjusted by the equation described above. However, it is still intuitive that U.S. market is more prosperous, as seen in FIG. 8. The virtual earth that corresponds to the US market is almost completely covered by spheres. In the China market, part of the virtual earth's surface, for example, the space for QDII is nearly empty.

Interactive operations are also fully examined in this case. By dragging the time axis or clicking the auto-play button, users can see the evolution of mutual fund market. As time goes by, spheres will change their color and move in or out of the earth. A few spheres vanish when certain mutual funds exit the market and new spheres will also come into the universe. With data filter, it is clear that QDII in China is still "breaking the ice." Several QDII "outliers" are also found to that have much higher NAV than other QDII spheres. By further investigation of their companies' background, potential business benefit and investment chances are confirmed.

Predictive Analysis of China QDII

In the beginning of year 2012, the total value of QDII in China was 9.07 billion RMB, accounting for only 2.5% of the whole mutual fund market assets (340.74 billion). While China QDII is just "breaking the ice", it is supposed to have great potential benefit for custodian business. The disclosed system and method allow prediction about the mutual fund market. The goal is to show the possible trends of mutual fund market. In this case, the predictive model is based on Z-Ben Advisors' research work, the contents of which are incorporated herein by reference.

Figure 9:
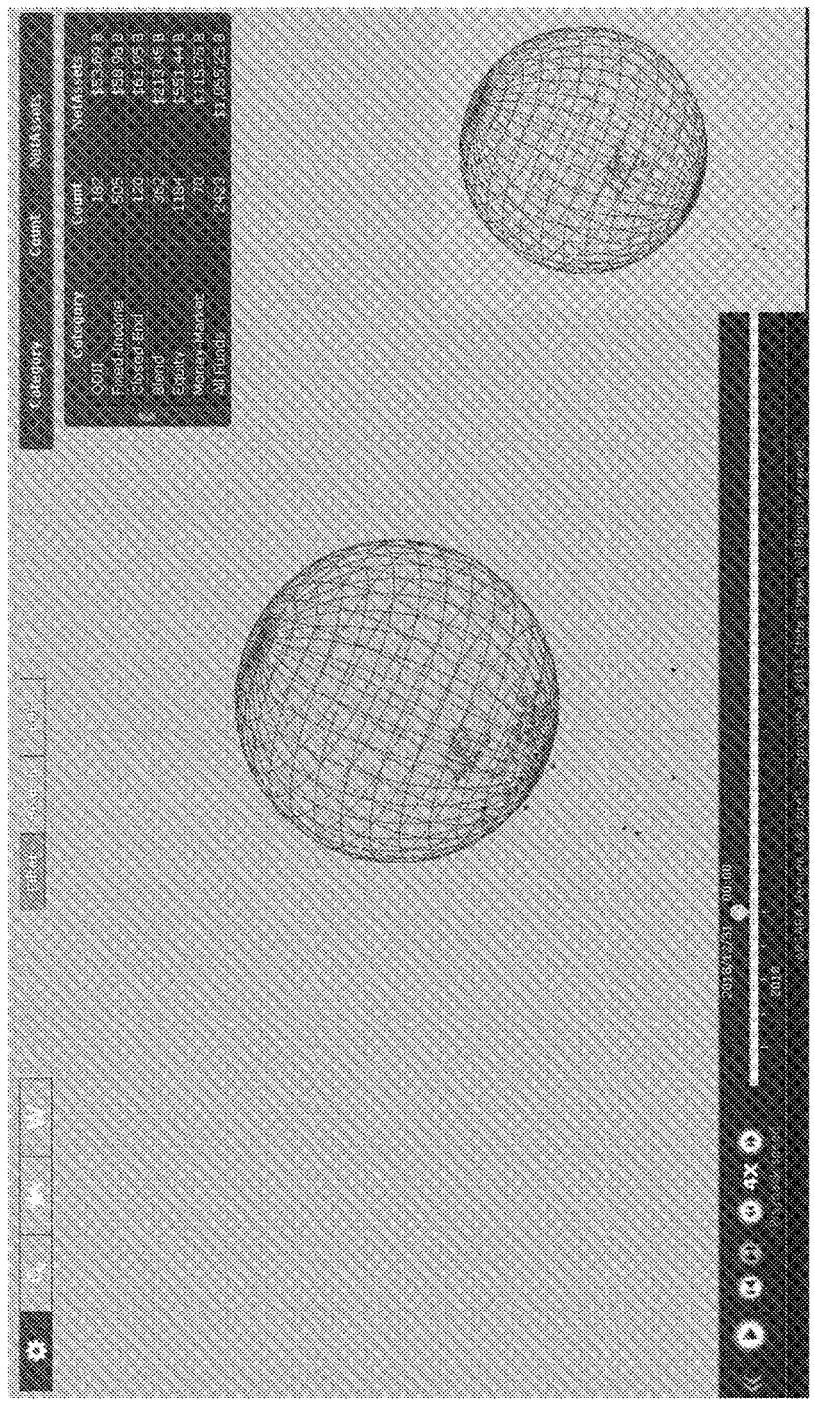
FIG. 9 shows a representative visualization of China's Qualified Domestic Institutional Investor ("QDII") in year 2018 with a comparison view according to embodiments of the present invention.
Figure 10:
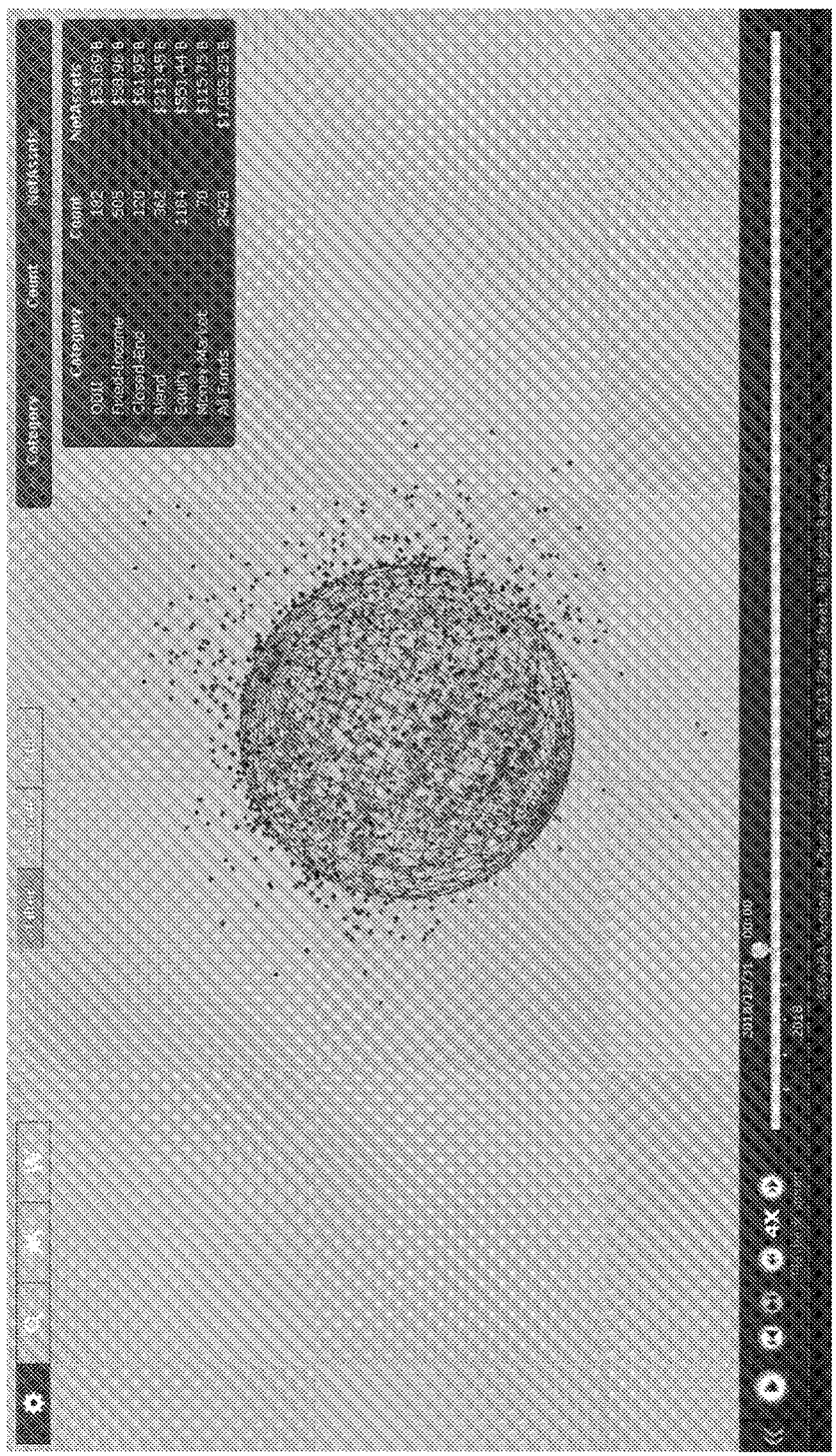
FIG. 10 shows a representative visualization of a predictive result of China QDII in year 2018 with all mutual funds shown in the universe according to embodiments of the present invention.

According to that predictive model, in year 2018, the total NAV of China QDII will grow to 53.69 billion, about six times larger than that in year 2012. The entire market assets will grow to 1055.25 billion, which is much slower than the growth rate of QDII. Since the capital of China QDII is increasing fast, when dragging the time axis to future time, many new spheres of QDII will be born in the universe, as shown in FIGS. 9 and 10. By auto-playing the market change from year 2012 to year 2018, the future trend of QDII is evident. This visualization can help financial analysts to make better-decisions and convince officers to adopt new policies.

Specifically, FIG. 9 shows China's QDII in year 2018 with a comparison view. Other types of funds are all filtered out from the visualization. The lower right corner shows the universe in year 2012. It is evident from the visualization that the China QDII grows rapidly.

FIG. 10 shows predictive results of China's QDII in year 2018 with all mutual funds shown in the universe. Spheres that represent QDII are highlighted with blue color. The visualization reveals that both the total NAV and the quantity of QDII have great potential to grow up.

Figure 11:
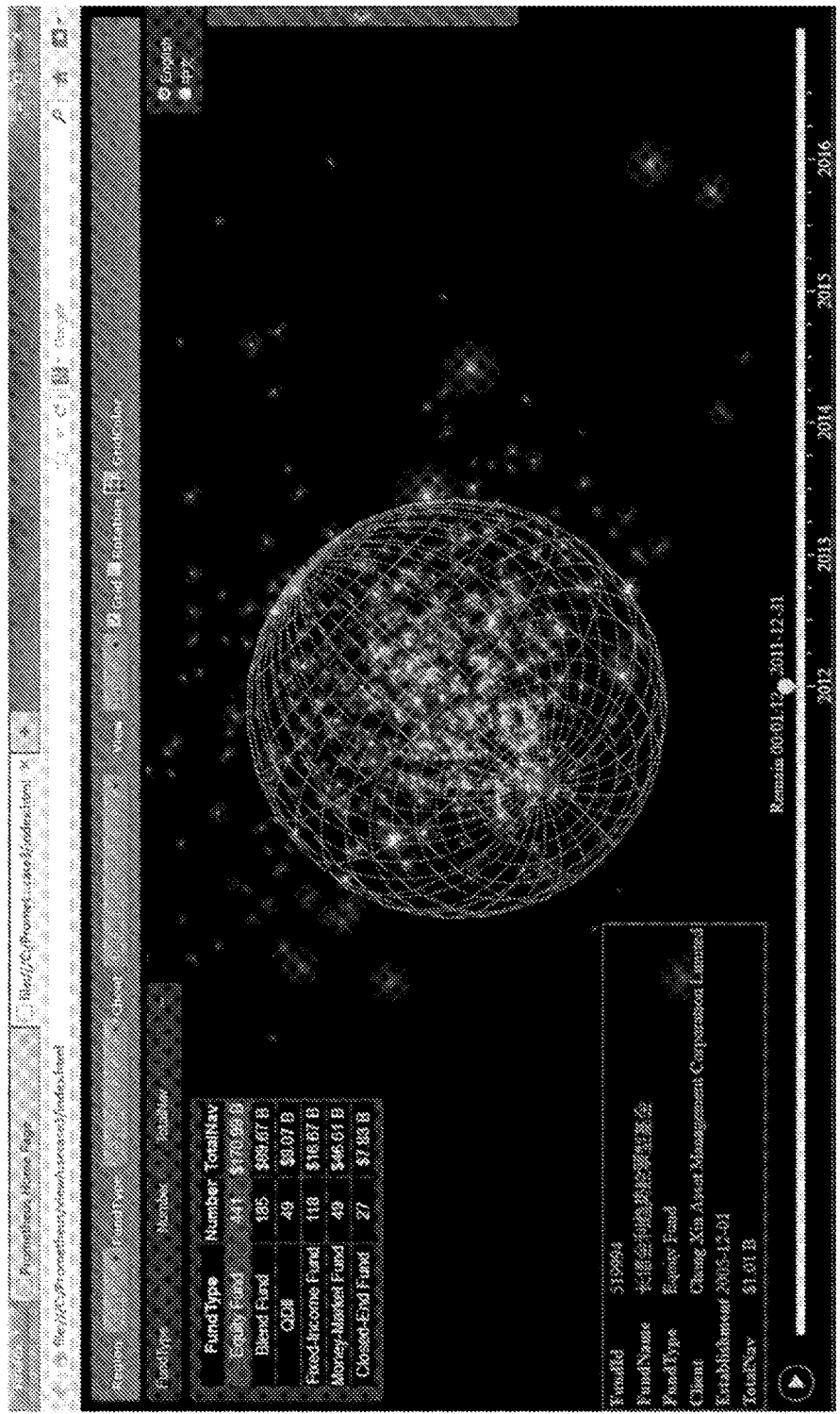
FIG. 11 shows a representative visualization of the China mutual fund market according to embodiments of the present invention.

Referring now to FIG. 11, generally at 1100, the visualization corresponds to the China mutual fund industry. As explained above, funds that over-perform the index are shown in a first color. Funds that under-perform are shown in a second color, while colors that perform according to the index are shown in a third color. The user can move a mouse pointer over a particular fund type, for example, "Equity Fund" as shown in FIG. 11. This will result in displaying the funds that belong to the particular fund type to be displayed in a fourth color. The representation of each of the fund data points in FIG. 11 use the "halo" effect rather than showing the size of the fund based on a hard sphere.

FIG. 12A shows external use case examples and visualization functionality for four different client segments. For example, the disclosed system can be targeted for C-suite executives and can provide useful visualizations of asset allocation, performance attribution, and enterprise risk management and regulatory affairs. The visualization functionality can be directed to an assessment of portfolio risk and performance by manager or factor, such as asset class, geography, sector, style, and liquidity. Portfolio managers and Retail investment advisors can be interested in asset selection and performance attribution visualizations. The visualization functionality can similarly be directed to an assessment of portfolio risk and performance by security or factor, such as asset class, geography, sector, style, and liquidity. Traders can be interested in asset allocation and transaction cost analysis. The visualization functionality can be directed to security selection by factor, such as style and liquidity.

FIG. 12B shows internal use case examples and visualization functionality for three different client segments.

Similarly to FIG. 12A, the disclosed system can target C-suite executives and can provide useful visualizations of asset allocation, performance attribution, risk management, and manager selection. The visualization functionality can be directed to an assessment of portfolio risk and performance by manager or factor, such as asset class, geography, sector, style, and liquidity. Traders and eExchange businesses can be interested in asset allocation and transaction cost analysis. The visualization functionality can be directed to security selection by factor, such as style and liquidity. General manager strategy teams can be interested in performance attribution and risk assessment. The visualization functionality can be directed to investor behavior by factor such as asset class, geography, sector, style, and liquidity.

The visualization system and method of the present invention can be used to pinpointing the root cause of problems and forecast future risks using mean time between failures, mean time to restore service and many other attributes. For example, users can identify a particular group of systems that require the most attention. The disclosed systems can help users to visualize future risks of different groups of systems.

Exemplary data models are health checks and risk predictions. The health check data model is used to show failure rate, time to restore service and burden to service of incidents that already occurred. The risk prediction data model can be used to predict the behavior in the future based on the incidents that occurred already.

All incidents come from different departments. Each department is mapped to different longitude intervals according to its proportion among all departments. Each incident category is mapped to different latitude intervals according to its proportion among all incidents category.

The number of problems relating to an incident is the most important factor in operational risk management. The more problems a particular type of incident has, the more attention it requires to be solved. If a type of incidents has many problems, it most likely will have a short mean time between failures unless the mean time to restore service is long.

The disclosed system and method offer great visualization of the number of problems. Because same type of incidents would be grouped together on the sphere, users can visually identify which incident group has had many problems and ones that have had little problems. For example, if one type of incidents has more problems than any other type, a specific part of the universe would be filled with spheres and users can easily identify the incident.

Recovery time is the time it takes for a system to recover after a failure. Incidents with long recovery time deserve more attention than incidents with short recovery time. We can also interpret recovery time as the age of a system. If a system has a long recovery time, this system most likely has been used a long time. The size of the sphere can be used to represent the duration of recovery time. Because the recovery time has a big range, log function can be used so that users can still see small spheres and the size difference between each sphere can still be obvious.

The distance from the center of the universe is the most intuitive way to represent the number of problems for a particular type of incident. It can be used to represent failure rate or the inverse of Mean Time Between Failures (MTBF) or the inverse of the log MTBF. The radius of the globe sphere is the average failure rate of all the incidents. This helps users to easily visualize the incident category and department with a high failure rate and deserve the most attention.

The "burden to service capacity" relates to the hour of the day and the date when the incident occurred. An incident that occurred near the end of working hours would create more losses than an incident occurred during nonworking hours. Color can be used to visualize the burden to service capacity. For example, red color can visualize severe incidents. Incidents with a moderate burden will be yellow and incidents with a low burden will be green.

For a risk prediction data model, relevant attributes can include reliability, availability, and serviceability. Reliability shows how reliable a system is and it can represent the probability that a system will survive to a certain time period. Availability shows the probability that a system is operational when required to be used. Serviceability shows how fast a system can be repaired after a failure, which is the same as a mean time to restore service.

The different mappings are summarized in the following table.

| Attribute | Health Check Data Model | Risk Prediction Data Model |
| --- | --- | --- |
| Longitude | Department | Department |
| Latitude | Incident categories | Incident categories |
| Distance | Failure rate or 1/log(MTBF) | Availability |
| Size | Log (Recovery Time) | Serviceability |
| Color | Burden to Service | Reliability |

Figure 13:
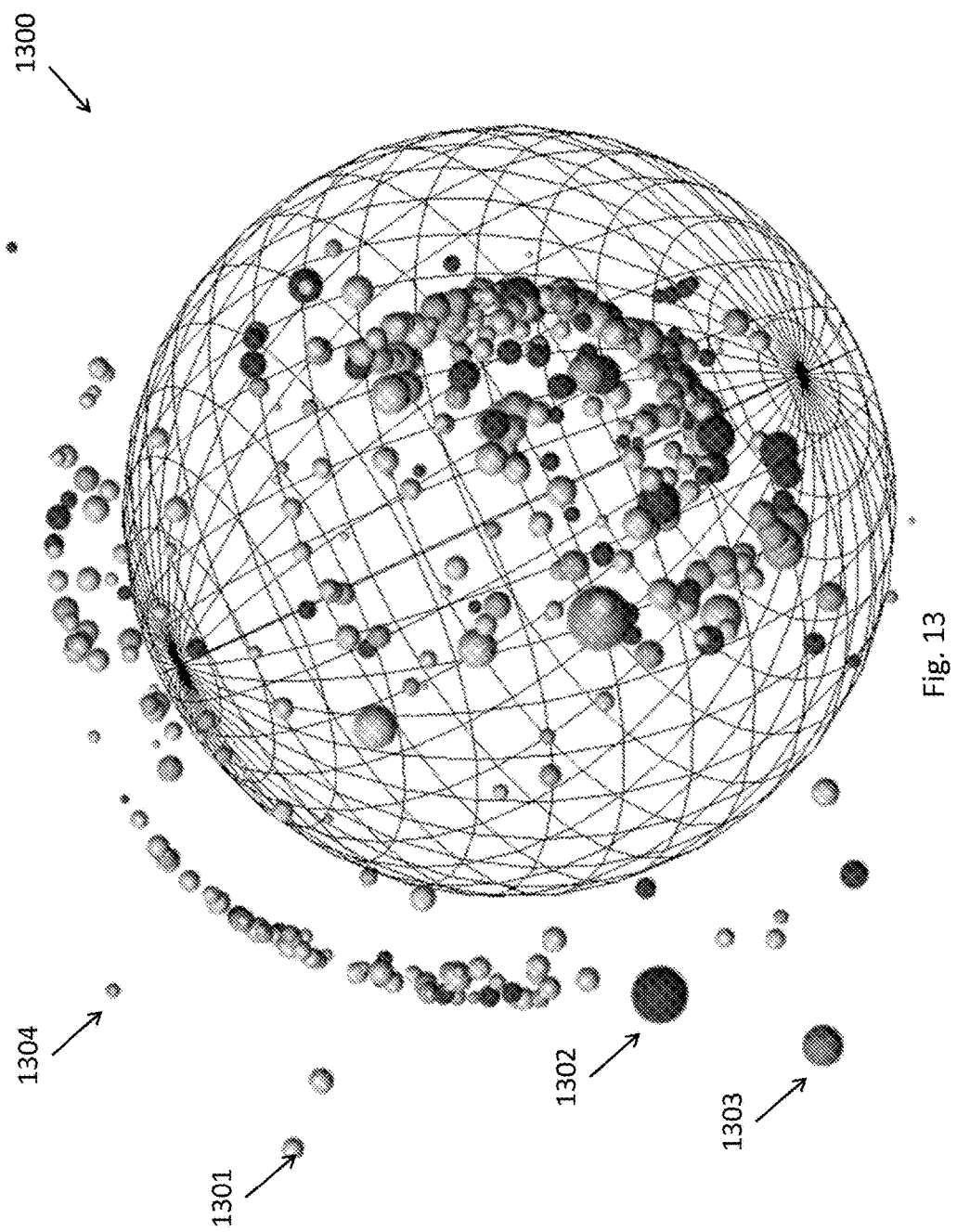
FIG. 13 shows an exemplary visualization of an operational risk data model.

An exemplary visual representation for an operational risk prediction data model can is presented in FIG. 13, generally at 1300. FIG. 13 displays spheres representing data points and displayed on a three-dimensional space according to the department and incident category of the corresponding data point. The mappings can be implemented based on the table above. For example, data points can be visualized as yellow spheres 1301, red spheres 1302, blue spheres, 1303, and green spheres 1304.

The visualization system and method of the present invention enables the construction and assessment of portfolio risk and performance, for example, by investment manager, financial industry sector, asset class, geography, or other factors in the context of time and spatial relationships to a benchmark, e.g. S&P 500, the Shanghai Index. The visualization system and method of the present invention also permits the construction and visualization of a Fund of Funds (FoF).

Generally, a FoF is an investment strategy of holding a portfolio of other investment funds rather than investing directly in stocks, bonds, or other securities. Accordingly, FoF portfolio construction and visualization according to the present invention relates to investing in a range of funds that work together to create an investment solution. FoF portfolio construction involves combining the fund investment strategy to address investment objectives and factors such as an aptitude to risk the investment and the expected life of the investment.

In building a FoF portfolio, there are two major considerations: (1) asset allocation, which relates to how an investment is spread across different asset types and regions and (2) fund selection, which relates to the choice of fund managers and funds to represent each of the chosen asset classes and sectors. It is generally understood that in the medium to long term, asset allocation usually has a large impact on the variability of a FoF portfolio's return.

According to the system and method of the present invention, system users are provided with a way to visually analyze a FoF's asset allocation over the medium to long-term. This will be explained in greater detail referring to exemplary FIGS. 14A-H.

Generally, FIGS. 14 A-H show exemplary visualizations of a FoF's asset construction, allocation, and evolution. Referring to FIG. 14A, generally at 1400A, a system user can create a FoF, by pressing a "+" symbol 1404 in the FOF control panel 1402. Before a new FoF is created, the initial state of a "Fund of Fund" control panel tab 1401 initially empty as is shown in FIG. 14A. More specifically, FoF tab 1401 is used to show the current state of the selected named FoF from the named "Fund of Fund" control panel 1402. As shown in FIG. 14A, the selected time period for analysis is YOY (year over year) 1403. However, other time periods may be selected and it would be still within the scope of the present invention.

Figure 14A:
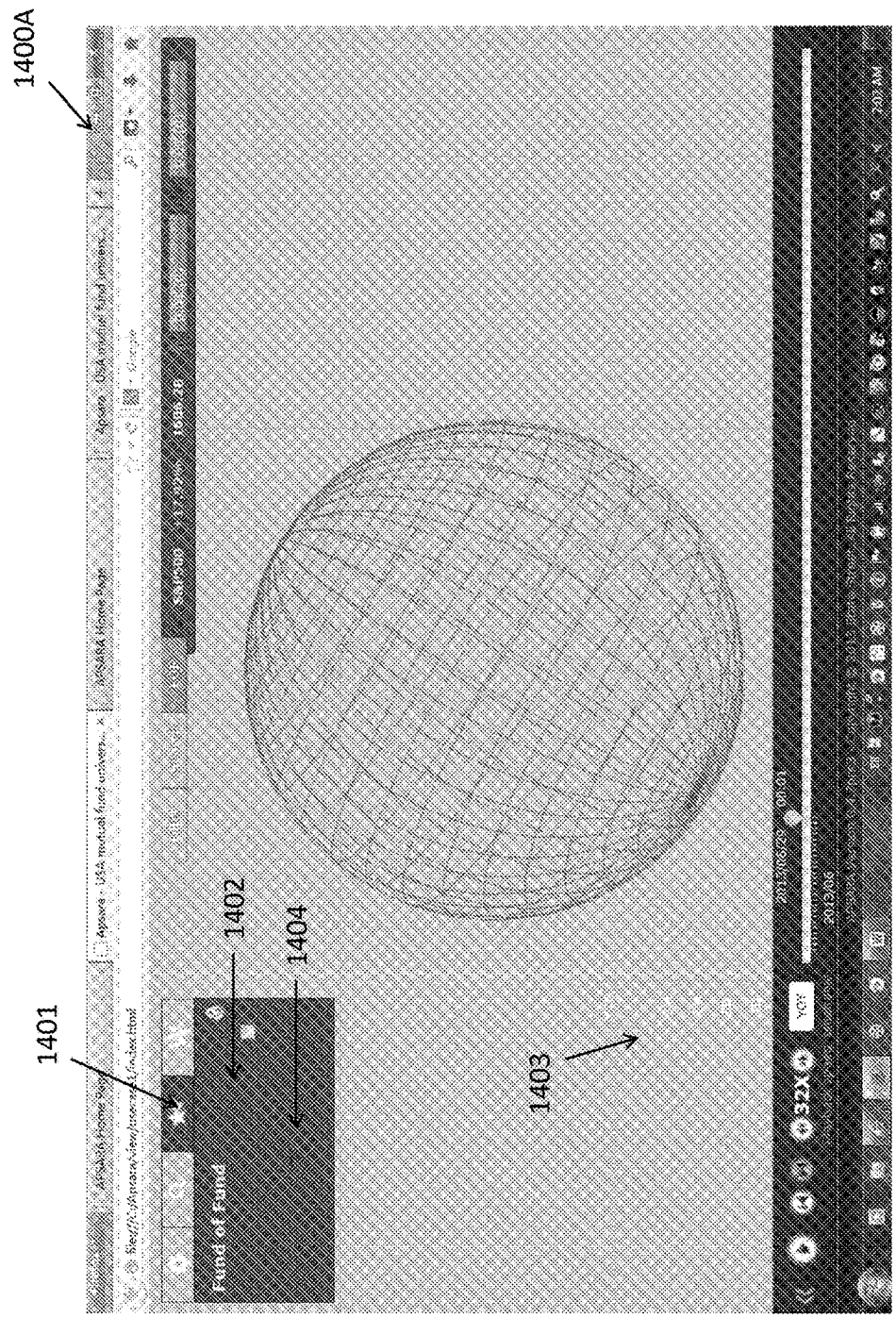
FIGS. 14-A-H show representative visualizations of portfolio risk and performance assessments according to embodiments of the present invention.
Figure 14B:
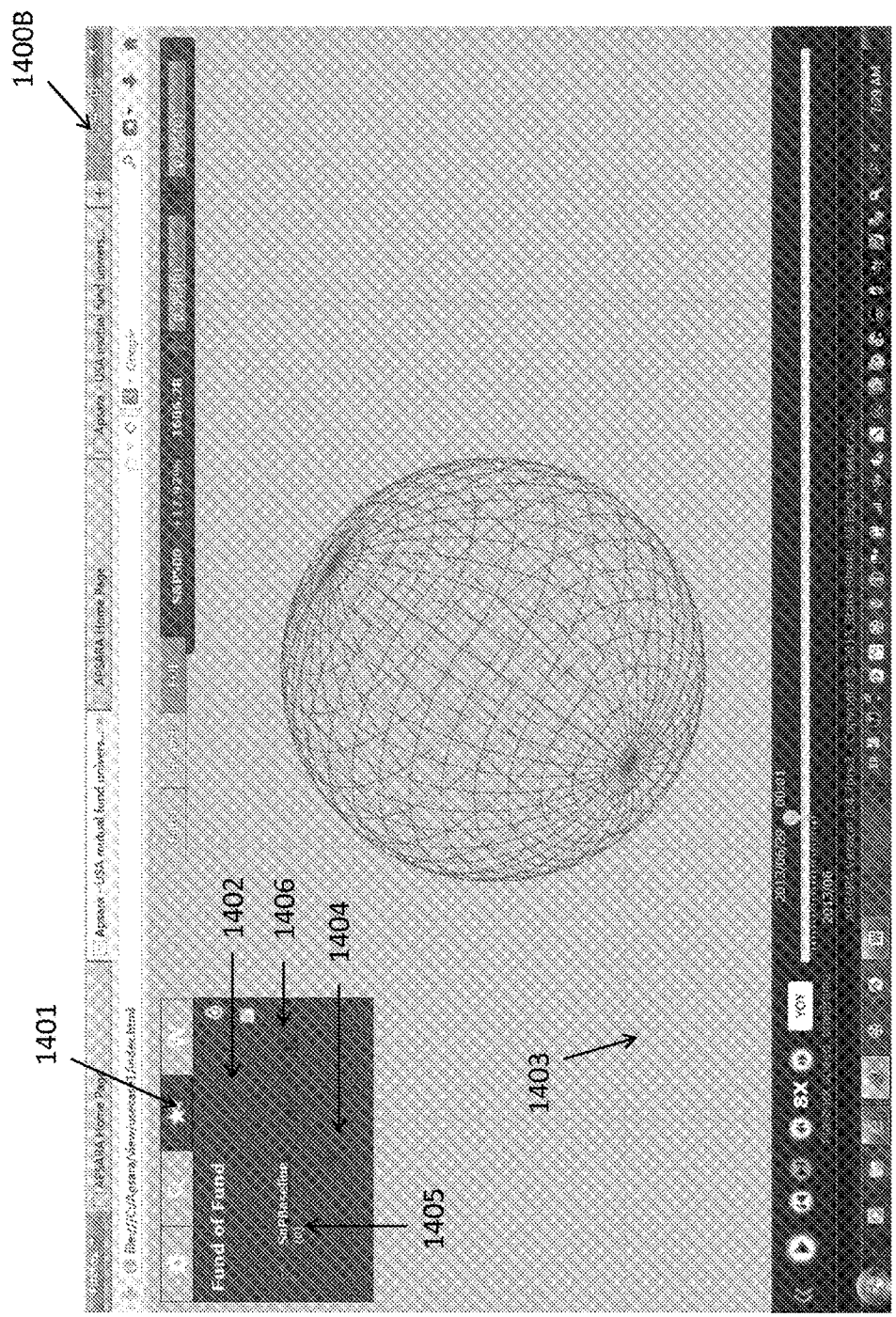

FIG. 14B, generally at 1400B, shows FoF control panel 1402 after a system user has created a FoF. In the example shown in FIG. 14B, the system user created the FoF called "SnPBaseline" at 1405. Control icons 1406 can be used to edit and delete the created FoF. For purposes of example only, the FoF created in FIG. 14B has the investment objective to outperform the S&P 500 index using YOY analysis. The asset selection strategy can include an analysis of S&P 500 funds across sector funds and exchange-traded funds (ETFs).

Figure 14C:
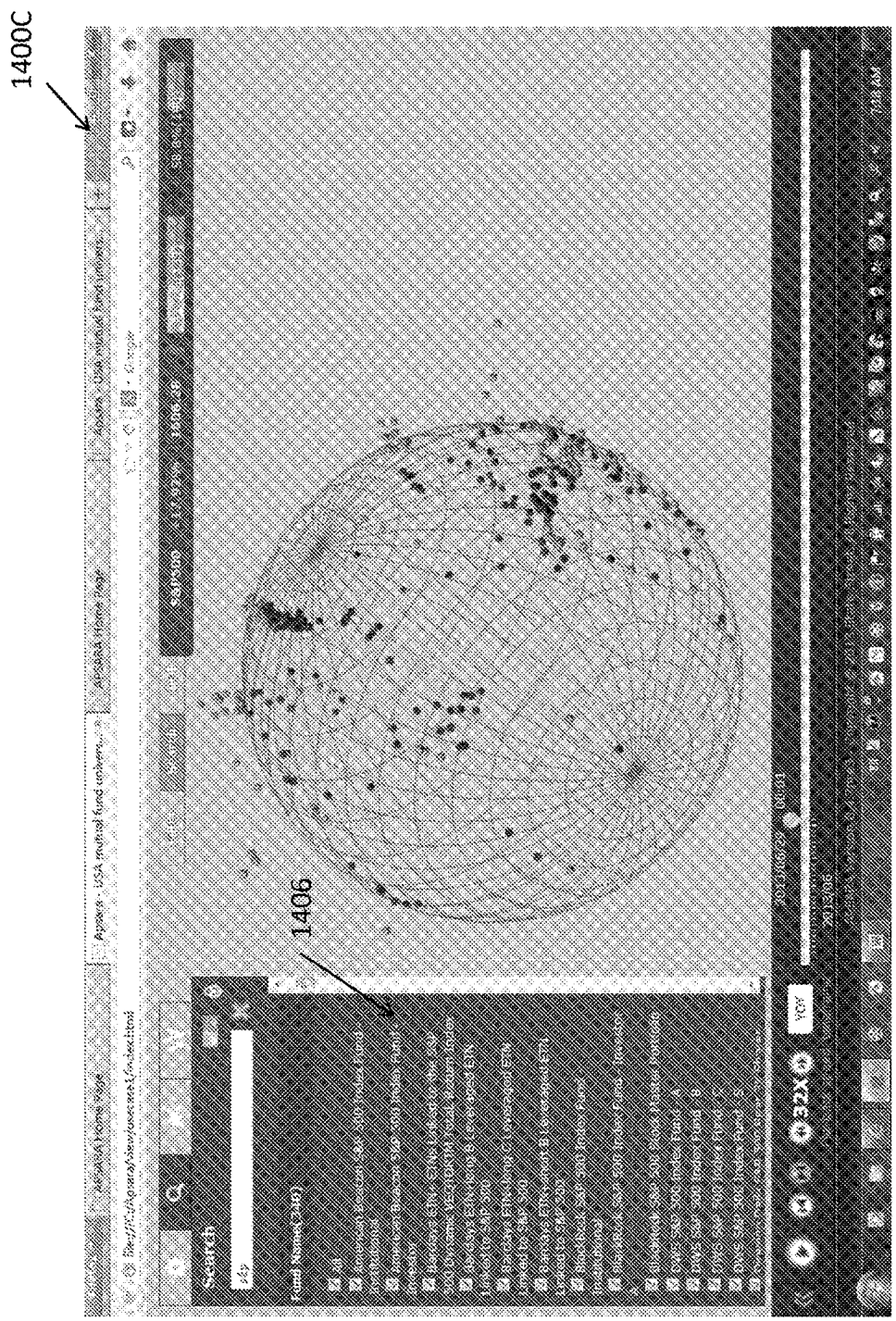
Figure 14D:
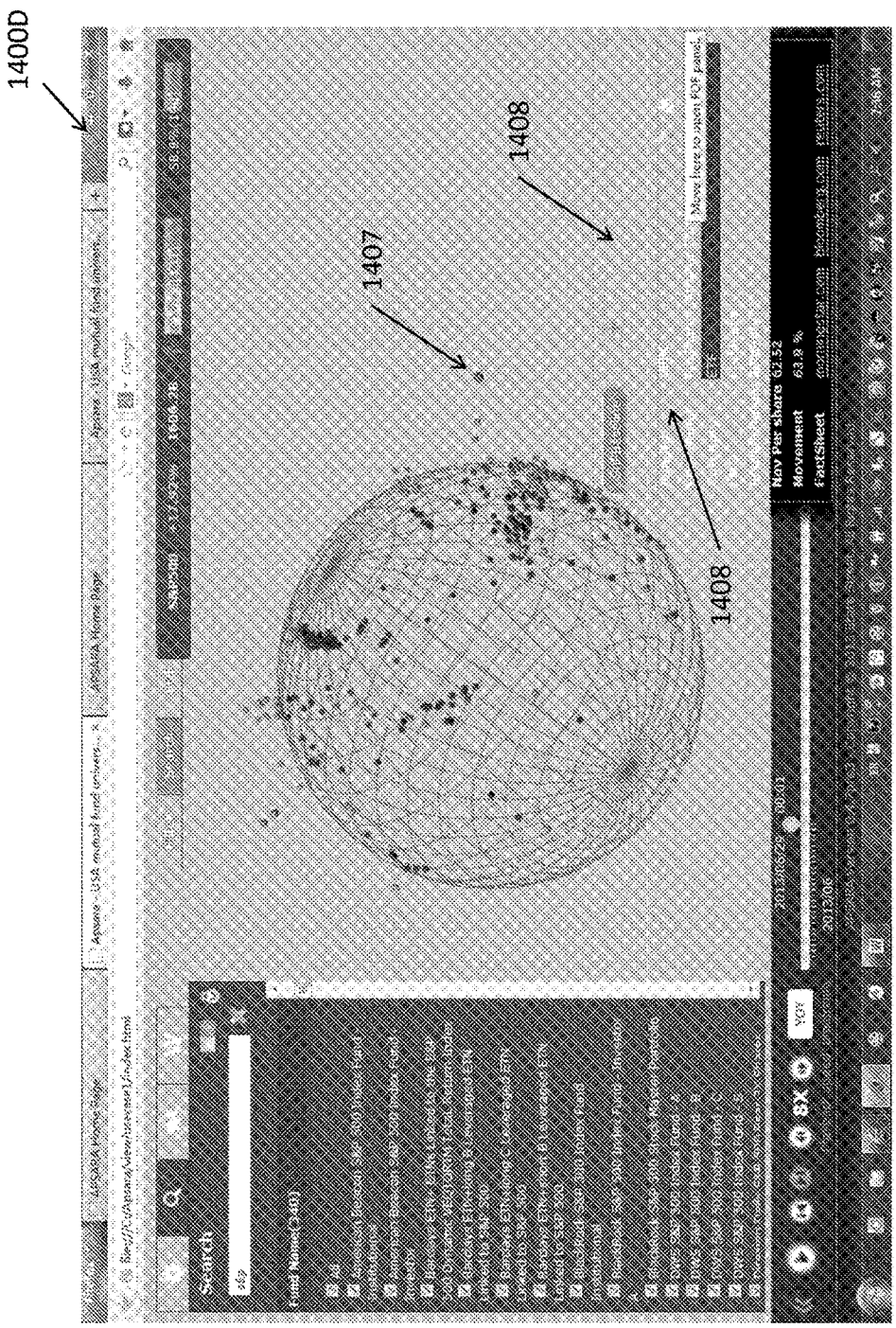
Figure 14E:
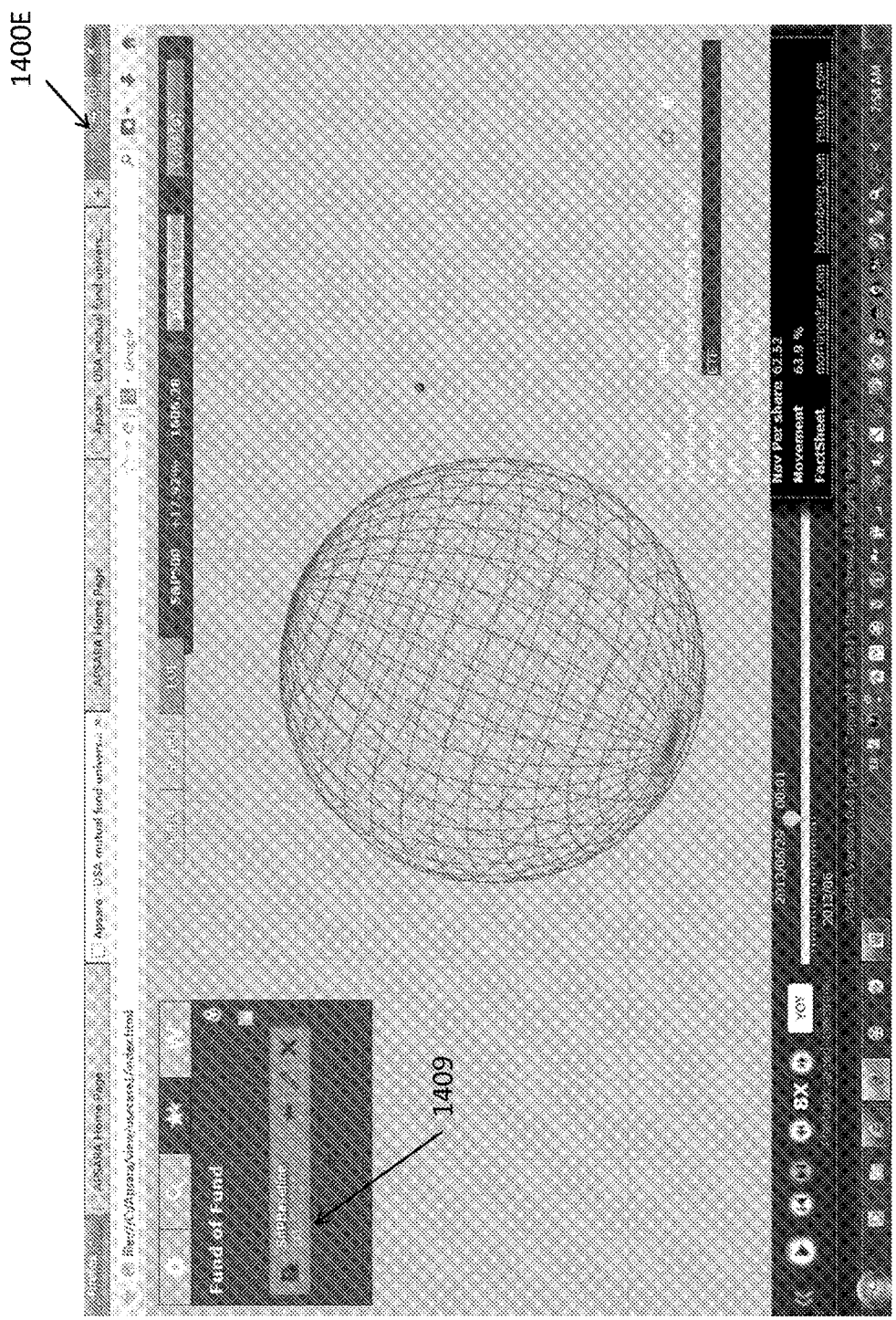

FIG. 14C, generally at 1400C, shows results 1406 from a query requesting all funds that have the keyword "s&p". FIG. 14D, generally at 1400D, shows the selection of the first fund 1407 for potentially adding to the new FoF and selected fund is Fund ID "UPRO" 1408. The system user has the option to open the FoF panel and add the selected fund to the SnPBaseline FoF 1408 or select another fund. FIG. 14E, generally at 1400E, shows the addition of a first fund 1409 (UPRO) for the new "SnPBaseline" FOF.

Figure 14F:
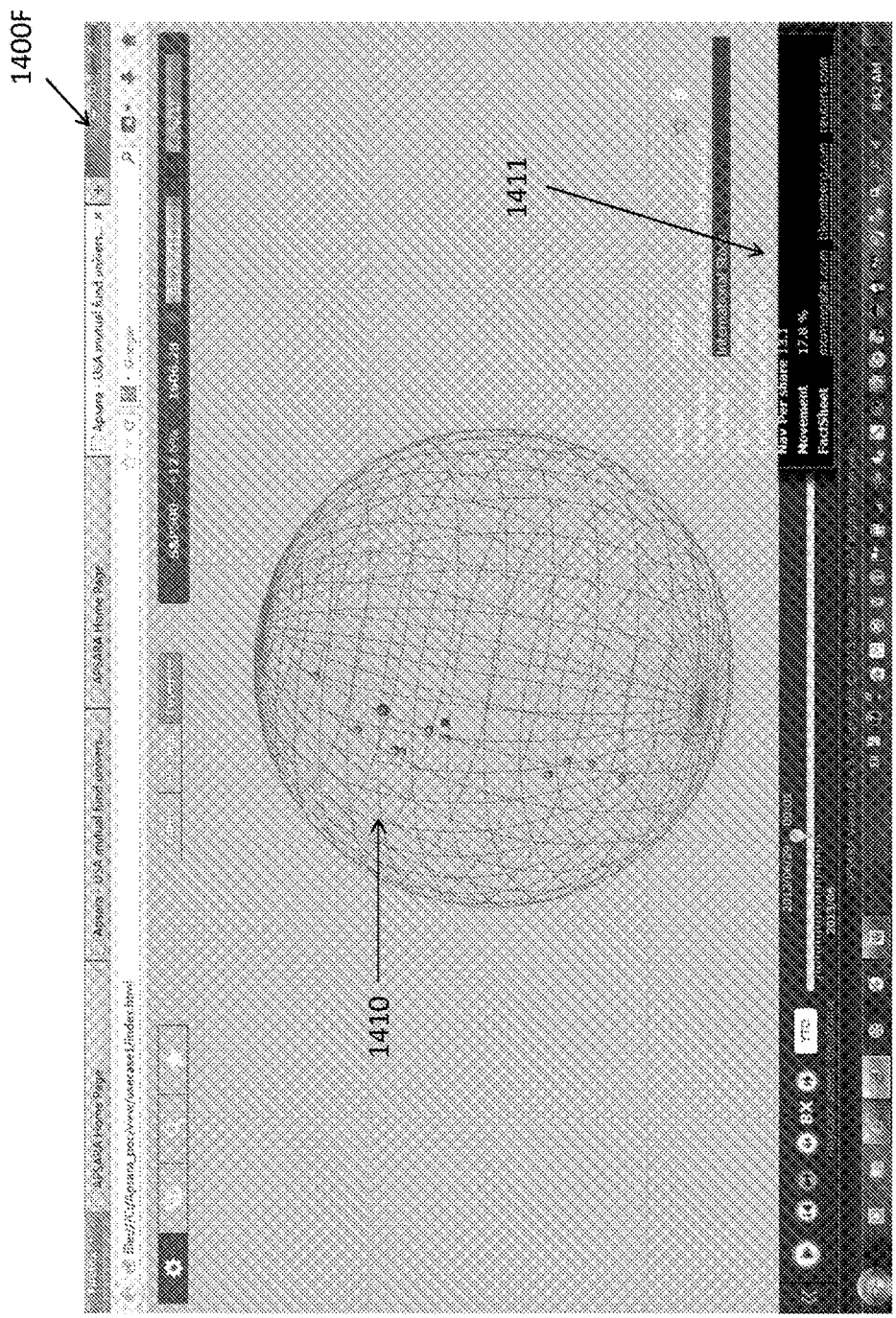
Figure 14G:
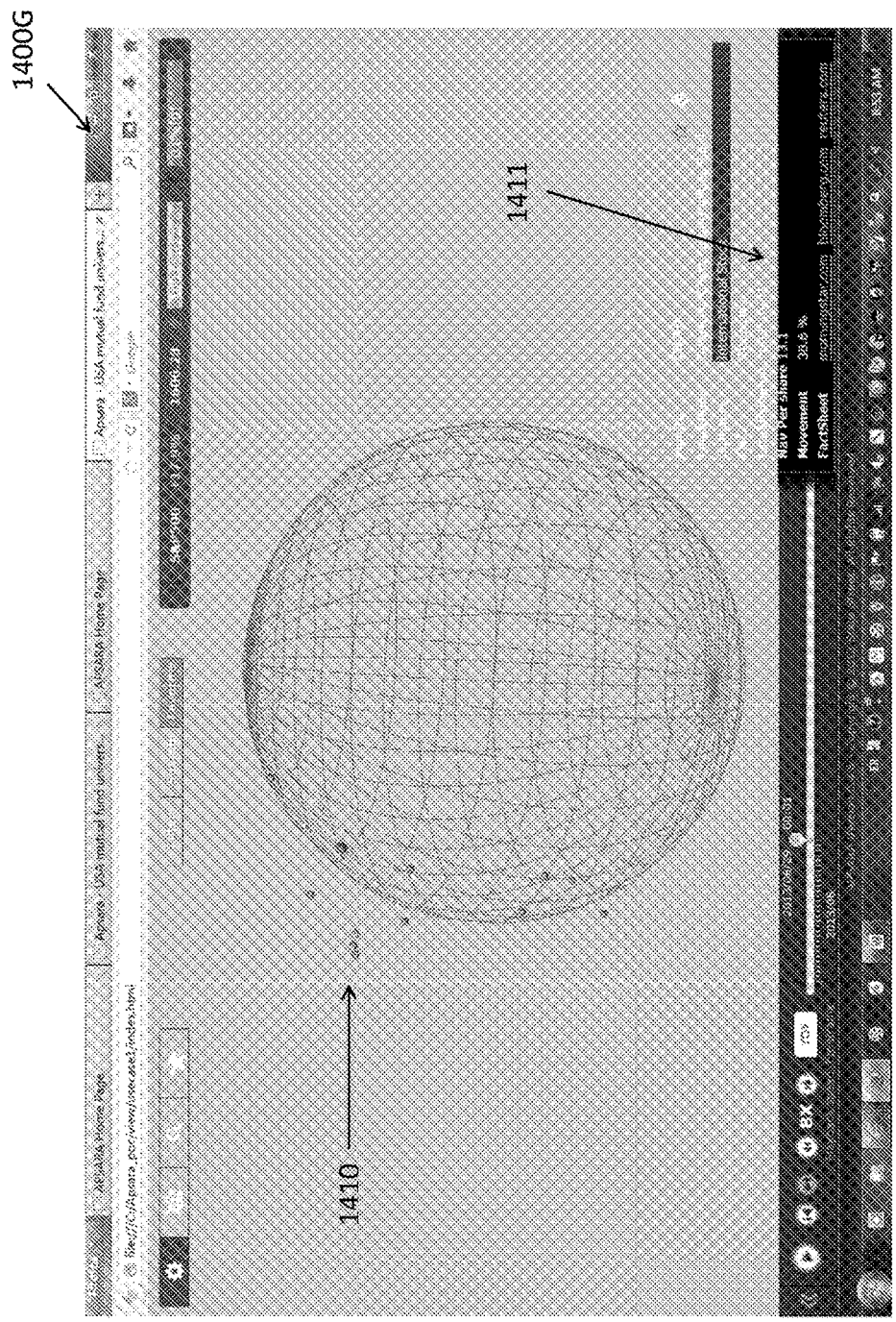
Figure 14H:
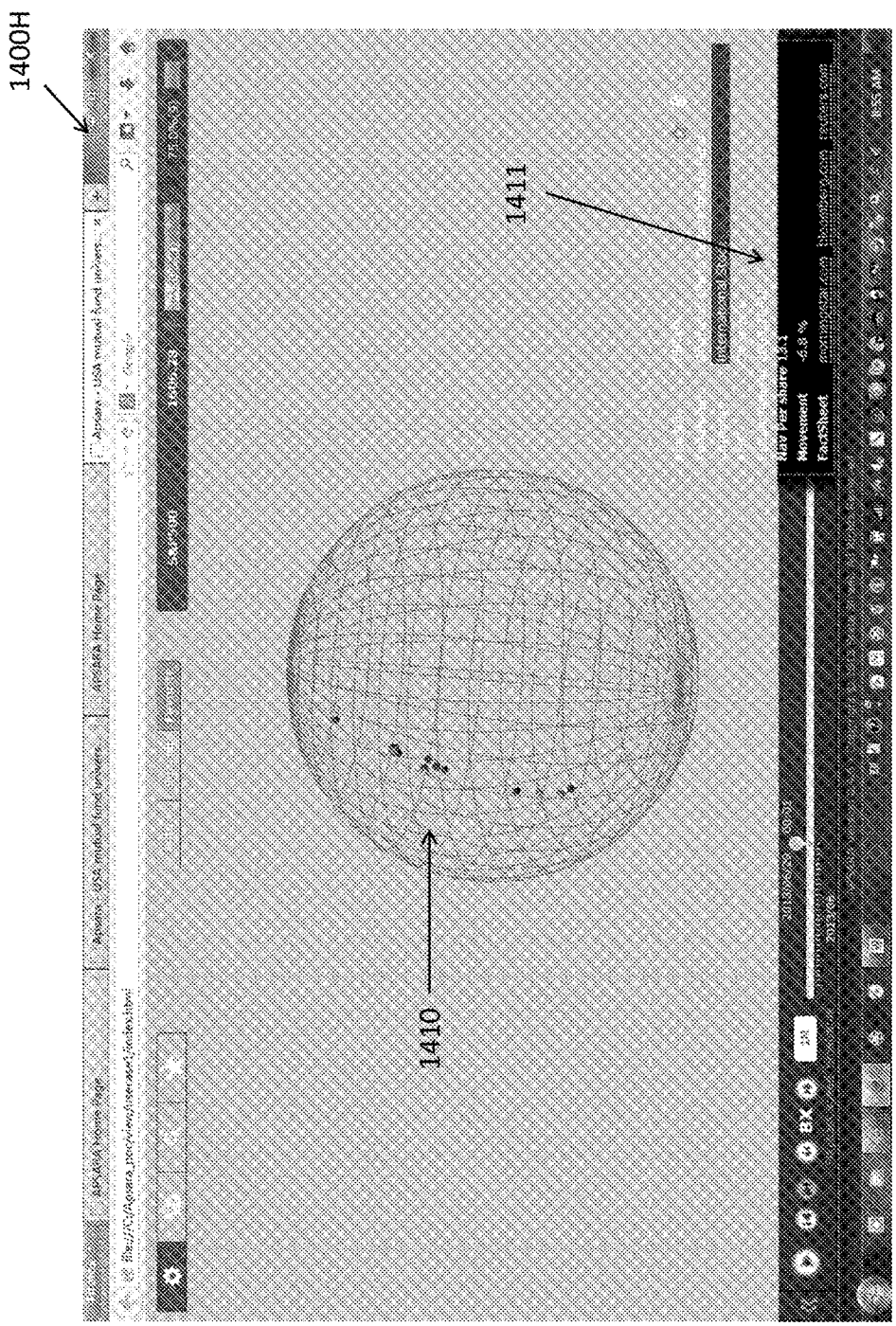

FIGS. 14F-H, generally at 1400F-H, respectively, show twelve funds 1410 that have been selected and aligned along the system user's longitude sector and aligned along the latitude sectors for the particular asset type for the particular selected funds. Further, these twelve funds are viewed in FIGS. 14F-H in different time periods and from different vantage points. FIGS. 14F-H, also show information of a selected fund "OBCHX" in different time periods.

The investments in a named FoF portfolio will perform according to the market. As the timeline progresses, a FoF portfolio's current asset allocation will drift away from the original target asset allocation, for example, their preferred level of risk exposure. If the portfolio is left unadjusted, it will either become too risky or too conservative. As such, the asset allocation of the FoF will be periodically rebalanced to move the current asset allocation back in line with the originally planned asset allocation objective, for example, a preferred level of risk exposure. The FoF functionality can provide a powerful visual tool to construct, monitor and rebalance the asset allocation over selected time periods.

Multi-User Collaboration

The disclosed system and method enable real-time collaborations between multiple users of different roles, including real-time information sharing, contents creation and distribution. The users of the system can implement business process, for example, fund accounting, via this collaboration capability. System users to have different roles can publish information, comment or change status, for example, a fund accountant publish fund processing status, via the front-end of the system. The system can propagate all the changes to the back-end and all front-end active users of various different roles in real-time, based on their access control and subscription of interest. System users monitor or act, based on real-time updates of multiple aspects of information from multiple sources via the front-end of the system. Exemplary actions include to approve, reject, or assign task. The system offers the option of integration of external systems to enable users to interact with other external systems and participate in individual business processes.

Customizable Visualization or Perspective Customization Capability

Users or operation staff can create new perspectives on the fly by creating mappings between visual parameters and business-data elements, which enable business-meaningful views for the users, without going through long-period of development period. The system can also allow users to observe the same set of large-scale data sets, in various business-meaningful angle, for example, by yield, by net-assets, or by risk.

The system can maintain a full set of business data dictionary and underlying mapped data sources. For each supported visual model, visual parameters are identified for a user to understand the visual model and subsequent mapping. The system user interface enables system users to map business parameters to visual parameters, therefore creating perspective views of the business parameters.

The system allows enhanced mapping, for example, linear-mapping, mapping to one or more enumerated values, mapping by mathematical calculation, for example, a cubic root, mapping combinations of business parameters to one or more visual parameter. Users can switch perspectives easily, during analysis of a selected data-set, and can look into various aspects of the data sets. Additionally, a user can adjust a perspective mapping during run-time, to see effect on-the-fly, for example by changing sphere/distribution/color.

Real-Time Event Capability (Event-Streaming)

An event animation capability allows capture and visualization of real-time external incoming incidents, for example, market data, news, external system or business incidents, and internal significant changes, for example meteor visual effects.

The system has a back-end process and can calculate external incoming incidents, as well as can pre-calculate and capture internal significant changes. The system back end can populate events to front-end users and users can act on events, per business process or can make discretionary decisions.

The system enables a generic meta-data based data service infrastructure. Generic meta-data based data service infrastructures enable the visual system to visualize various possible sources of business data. The system can maintain a full set of business data dictionary and underlying mapped data sources. The system provides service-oriented data-service, based on data consumer provided data-service descriptor. The data service descriptor can include, for example, meta-data description of needed data, data format (XML, Json, etc.), data provision channel (http, ftp), data provision approach (ad-hoc query, publish/subscribe, etc.).

Sound and Musical Effect Capability

The system can include a value map to certain musical tone of corresponding frequency. Temporal data of each star-object can be mapped to a single melody. The overall melody will be the synthesis of single melodies of a set of data-objects' temporal data. The overall melody will reflect data or events in a human sensible way, for example the melody can reflect the stock market trend or mood.

The equations and formulas presented herein are only for illustrative and exemplary purposes. Various alternative equations and formulas will be apparent to those skilled in the art; those alternative equations and formulas are within the scope of the disclosed subject matter.

The embodiments or portions thereof of the system and method of the present invention may be implemented in computer hardware, firmware, and/or computer programs executing on programmable computers or servers that each includes a processor and a storage medium readable by the processor (including volatile and non-volatile memory and/or storage elements). Any computer program may be implemented in a high-level procedural or object-oriented programming language to communicate within and outside of computer-based systems.

Any computer program may be stored on an article of manufacture, such as a storage medium (e.g., CD-ROM, hard disk, or magnetic diskette) or device (e.g., computer peripheral), that is readable by a general or special purpose programmable computer for configuring and operating the computer when the storage medium or device is read by the computer to perform the functions of the embodiments. The embodiments, or portions thereof, may also be implemented as a machine-readable storage medium, configured with a computer program, where, upon execution, instructions in the computer program cause a machine to operate to perform the functions of the embodiments described above.

The embodiments, or portions thereof, of the system and method of the present invention described above may be used in a variety of applications. Although the embodiments, or portions thereof, are not limited in this respect, the embodiments, or portions thereof, may be implemented with memory devices in microcontrollers, general purpose microprocessors, digital signal processors (DSPs), reduced instruction-set computing (RISC), and complex instruction-set computing (CISC), among other electronic components. Moreover, the embodiments, or portions thereof, described above may also be implemented using integrated circuit blocks referred to as main memory, cache memory, or other types of memory that store electronic instructions to be executed by a microprocessor or store data that may be used in arithmetic operations.

The descriptions are applicable in any computing or processing environment. The embodiments, or portions thereof, may be implemented in hardware, software, or a combination of the two. For example, the embodiments, or portions thereof, may be implemented using circuitry, such as one or more of programmable logic (e.g., an ASIC), logic gates, a processor, and a memory.

Various modifications to the disclosed embodiments will be apparent to those skilled in the art, and the general principals set forth below may be applied to other embodiments and applications. Thus, the present invention is not intended to be limited to the embodiments shown or described herein.

What is claimed is:

1. An apparatus for generating a graphical user interface for displaying multi-dimensional temporal data on a display device, comprising:
   an input component to receive one or more data feeds comprising a plurality of data points;
   a processor device to generate a graphical user interface based upon the one or more received data feeds, wherein the processor device is a graphical processing unit and the graphical processing unit utilizes one or more libraries and functions to generate and present the three-dimensional global sphere;
   a display device for displaying the generated graphical user interface; and a storage device comprising instructions that, when executed by the processor device, cause the processor device to:

generate a three-dimensional global sphere displayed within the graphical user interface on the display device based upon a first predetermined set of rules for determining a radius of the three-dimensional global sphere;

segment the three-dimensional global sphere displayed within the graphical user interface on the display device according to longitudinal segments to define a first criterion for locating a data point in one of the longitudinal segments;

segment the three-dimensional global sphere displayed within the graphical user interface on the display device according to latitudinal segments to define a second criterion for locating a data point in one of the latitudinal segments;

track one or more changes of each data point from a time $T_0$ to time $T_N$ according to information about each data point received from the one or more data feeds;

generate a modified three-dimensional global sphere based upon the one or more tracked changes;

present the modified three-dimensional global sphere within the graphical user interface on the display device;

receive, via an input device, one or more user interactions with the modified three-dimensional global sphere presented within the graphical user interface on the display device; and update the modified three-dimensional global sphere within the graphical user interface displayed on the display device.

2. The apparatus of claim 1, wherein the one or more user interactions include at least one of a rotation and a zoom performed on the modified three-dimensional global sphere to enable a user to see occluded areas of the modified three-dimensional global sphere.

3. The apparatus of claim 1, wherein the one or more user interactions include a click on a Hypertext Transfer Protocol (HTTP) link associated with the modified three-dimensional global sphere and the processor device to cause presentation of a website relating to the three-dimensional global sphere.

4. The apparatus of claim 1, wherein the longitudinal segments, the latitudinal segments and distance to a center of the three-dimensional global sphere define a data model for presentation on the display device.

5. The apparatus of claim 1, the processor device to linearly map the radius of the three-dimensional global sphere to a display area of the graphical user interface to present on the display device.

6. The apparatus of claim 1, the processor device to log-linearly map the radius of the three-dimensional global sphere to a display area of the graphical user interface to present on the display device.

7. A computer-implemented method to generate a graphical user interface for displaying multi-dimensional temporal data on a display device, comprising:

utilizing, by a graphical processing unit, one or more libraries and functions to generate and present a three-dimensional global sphere displayed within the graphical user interface on the display device based upon a first predetermined set of rules for determining a radius of the three-dimensional global sphere;

segmenting the three-dimensional global sphere displayed within the graphical user interface on the display device according to longitudinal segments to define a first criterion for locating a data point in one of the longitudinal segments;

segmenting the three-dimensional global sphere displayed within the graphical user interface on the display device according to latitudinal segments to define a second criterion for locating a data point in one of the latitudinal segments;

tracking one or more changes of each data point from a time $T_0$ to time $T_N$ according to information about each data point received from one or more data feeds via an input component;

generating a modified three-dimensional global sphere based upon the one or more tracked changes;

presenting the modified three-dimensional global sphere within the graphical user interface on the display device;

receiving, via an input device, one or more user interactions with the modified three-dimensional global sphere presented within the graphical user interface on the display device; and updating the modified three-dimensional global sphere within the graphical user interface displayed on the display device.

8. The computer-implemented method of claim 7, wherein the one or more user interactions include at least one of a rotation and a zoom performed on the modified three-dimensional global sphere to enable a user to see occluded areas of the modified three-dimensional global sphere.

9. The computer-implemented method of claim 7, wherein the one or more user interactions include a click on a Hypertext Transfer Protocol (HTTP) link associated with the modified three-dimensional global sphere and causing presentation of a website relating to the three-dimensional global sphere based on the one or more user interactions including the click on the HTTP link.

10. The computer-implemented method of claim 7, wherein the longitudinal segments, the latitudinal segments and distance to a center of the three-dimensional global sphere define a data model for presentation on the display device.

11. The computer-implemented method of claim 7, comprising linearly mapping a radius of the three-dimensional global sphere to a display area of the graphical user interface to present on the display device.

12. The computer-implemented method of claim 7, comprising log-linearly mapping a radio of the three-dimensional global sphere to a display area of the graphical user interface to present on the display device.

13. A non-transitory computer-readable storage medium comprising a plurality of instructions that, when executed by a processor, enable the processor to:

utilizing, by a graphical processing unit, one or more libraries and functions to generate and present a three-dimensional global sphere displayed within a graphical user interface on a display device based upon a first predetermined set of rules for determining a radius of the three-dimensional global sphere;

segment the three-dimensional global sphere displayed within the graphical user interface on the display device according to longitudinal segments to define a first criterion for locating a data point in one of the longitudinal segments;

segment the three-dimensional global sphere displayed within the graphical user interface on the display device according to latitudinal segments to define a second criterion for locating a data point in one of the latitudinal segments;

track one or more changes of each data point from a time $T_0$ to time $T_N$ according to information about each data point received from one or more data feeds via an input component;

generate a modified three-dimensional global sphere based upon the one or more tracked changes;

present the modified three-dimensional global sphere within the graphical user interface on the display device;

receive, via an input device, one or more user interactions with the modified three-dimensional global sphere presented within the graphical user interface on the display device; and update the modified three-dimensional global sphere within the graphical user interface displayed on the display device.

14. The non-transitory computer-readable storage medium of claim 13, wherein the one or more user interactions include at least one of a rotation and a zoom performed on the modified three-dimensional global sphere to enable a user to see occluded areas of the modified three-dimensional global sphere.

15. The non-transitory computer-readable storage medium of claim 13, wherein the one or more user interactions include a click on a Hypertext Transfer Protocol (HTTP) link associated with the modified three-dimensional global sphere and the processor to cause presentation of a website relating to the three-dimensional global sphere based on the one or more user interactions including the click on the HTTP link.

16. The non-transitory computer-readable storage medium of claim 13, wherein the longitudinal segments, the latitudinal segments and distance to a center of the three-dimensional global sphere define a data model for presentation on the display device.

17. The non-transitory computer-readable storage medium of claim 13, the processor to linearly map or log-linearly map a radius of the three-dimensional global sphere to a display area of the graphical user interface to present on the display device.

* * * * *